United States Patent
Saegusa et al.

(10) Patent No.: US 9,678,204 B2
(45) Date of Patent: Jun. 13, 2017

(54) SPEED MEASURING DEVICE FOR MOVING BODIES

(71) Applicants: Hiroshi Saegusa, Hiratsuka (JP); Tsuyoshi Kitazaki, Hiratsuka (JP)

(72) Inventors: Hiroshi Saegusa, Hiratsuka (JP); Tsuyoshi Kitazaki, Hiratsuka (JP)

(73) Assignee: The Yokohama Rubber Co., LTD. (JP)

(*) Notice: Subject to any disclaimer, the term of this patent is extended or adjusted under 35 U.S.C. 154(b) by 448 days.

(21) Appl. No.: 14/360,446

(22) PCT Filed: Nov. 21, 2012

(86) PCT No.: PCT/JP2012/007477
§ 371 (c)(1),
(2) Date: May 23, 2014

(87) PCT Pub. No.: WO2013/076979
PCT Pub. Date: May 30, 2013

(65) Prior Publication Data
US 2014/0320334 A1    Oct. 30, 2014

(30) Foreign Application Priority Data
Nov. 25, 2011 (JP) .................... 2011-257982

(51) Int. Cl.
*G01S 13/58* (2006.01)
*G01S 7/04* (2006.01)
(Continued)

(52) U.S. Cl.
CPC ............. *G01S 13/589* (2013.01); *G01S 7/04* (2013.01); *G01S 13/583* (2013.01); *H01Q 1/242* (2013.01);
(Continued)

(58) Field of Classification Search
CPC ........ G01S 13/589; G01S 13/583; G01S 7/04; G01S 2007/027; H01Q 1/242; H01Q 3/04; A63B 69/36
(Continued)

(56) References Cited

U.S. PATENT DOCUMENTS 5,375,832 A * 12/1994 Witler .................... A63B 69/36
473/199
5,401,026 A * 3/1995 Eccher ............... A63B 24/0021
342/109
(Continued)

FOREIGN PATENT DOCUMENTS

DE   102005027593 A1 *  1/2006 ......... A63B 69/3614
JP   S57-048470        3/1982
(Continued)

OTHER PUBLICATIONS

International Search Report dated Feb. 12, 2013, 4 pages, Japan.

*Primary Examiner* — John B Sotomayor
(74) *Attorney, Agent, or Firm* — Thorpe North & Western

(57) ABSTRACT

A speed measuring device has an antenna with directionality that transmits a transmission wave toward the moving body based on a transmission signal supplied from a Doppler sensor, and receives a reflected wave reflected by the moving body to generate and supply to the Doppler sensor a reception signal. An imaginary line extending along a direction in which a gain of the antenna is maximized is defined as an imaginary axis that indicates an orientation direction of the antenna. An antenna supporting unit is provided on a housing and supports the antenna so an inclination of the imaginary axis can be altered. A display is provided on an upper surface of the housing with a flat display surface of a rectangular shape facing upward and displays various display contents including the movement speed of the moving body on the display surface.

18 Claims, 20 Drawing Sheets

(51) Int. Cl.
*H01Q 1/24* (2006.01)
*H01Q 3/04* (2006.01)
*A63B 69/36* (2006.01)
*G01S 7/02* (2006.01)

(52) U.S. Cl.
CPC ............... *H01Q 3/04* (2013.01); *A63B 69/36* (2013.01); *G01S 2007/027* (2013.01)

(58) Field of Classification Search
USPC .......................................... 342/104, 114, 115
See application file for complete search history.

(56) References Cited

U.S. PATENT DOCUMENTS

| | | | | |
|---|---|---|---|---|
| 5,486,002 | A * | 1/1996 | Witler | A63B 24/0021 473/199 |
| 5,700,204 | A * | 12/1997 | Teder | A63B 24/0021 473/199 |
| 7,255,649 | B1 * | 8/2007 | McConnell | A63B 24/0021 473/199 |
| 2006/0008116 | A1 * | 1/2006 | Kiraly | G06T 7/0018 382/103 |
| 2006/0287117 | A1 * | 12/2006 | Dilz | A63B 24/0021 473/131 |
| 2013/0113961 | A1 * | 5/2013 | Ishii | H04N 5/262 348/231.3 |
| 2013/0194128 | A1 * | 8/2013 | Van Der Merwe | G01S 13/582 342/107 |
| 2014/0320334 | A1 * | 10/2014 | Saegusa | G01S 7/04 342/104 |
| 2016/0202353 | A1 * | 7/2016 | Saegusa | G01S 13/58 342/113 |

FOREIGN PATENT DOCUMENTS

| | | |
|---|---|---|
| JP | S62-172287 | 7/1987 |
| JP | 2002311135 A * | 10/2002 |
| JP | 2003210638 A * | 7/2003 |
| JP | 2006-326318 | 12/2006 |
| JP | 2008-246139 | 10/2008 |
| JP | 2008246139 A * | 10/2008 |
| JP | 2009-109194 | 5/2009 |
| JP | 2009213934 A * | 9/2009 |
| JP | 2010025737 A * | 2/2010 |
| JP | 2011-89907 | 5/2011 |
| JP | 2011-102718 | 5/2011 |
| JP | 2011-152291 | 8/2011 |
| JP | 2012231908 A * | 11/2012 |
| JP | 5182266 B2 * | 4/2013 |

* cited by examiner

SPEED MEASURING DEVICE FOR MOVING BODIES

TECHNICAL FIELD

The present technology relates to a speed measuring device for a moving body.

BACKGROUND

As a method of measuring a speed of a moving body, a Doppler method that transmits an electromagnetic wave as a transmission wave from an antenna and calculates the speed of the moving body from a frequency variation between the transmission wave and a reflected wave from the moving body is widely known.

As a speed measuring device for a moving body that uses the Doppler method, a measuring device for a head speed of a golf club head, for example, has been proposed (see Japanese Unexamined Patent Application Publication Nos. 2006-326318A and 2008-246139A).

These conventional devices are configured by incorporating an antenna, which transmits the transmission wave toward the golf club head that is the moving body and receives the reflected wave from the moving body, and a display into a unitary housing.

In the Doppler method, it is important that a transmission direction of the transmission wave and a movement direction of the moving body match as much as possible to ensure measurement accuracy.

Therefore, a layout of the antenna and the display is configured so that, in a state where the housing is installed so that an orientation direction of the antenna is parallel to the movement direction of the golf club head, a user can easily see display contents (head speed and the like) of the display.

Specifically, an installation location of the housing of the speed measuring device is a location on the ground behind a ball to be struck by the golf club head or a location on the ground to a side of the ball that does not interfere with swinging, and the display faces upward or obliquely upward so that the user who swings the golf club can easily view the display of the speed measuring device.

Incidentally, it is also conceivable to measure, for example, a speed of a ball when pitching a baseball or a swing speed when swinging a baseball bat using such a speed measuring device for a moving body.

In these situations, it is preferred that the speed measuring device is disposed in a location away from the ground and in front of the user by supporting the speed measuring device using a stand or the like so that the orientation direction of the antenna matches a movement direction of the ball or a movement direction of the bat as much as possible.

However, disposing the speed measuring device in this manner causes the display to face upward or obliquely upward, and it becomes difficult for the user behind the speed measuring device to view the display. Because of this, the user must approach the speed measuring device to see the display each time speed measurement is implemented, which decreases usability.

Furthermore, if the speed measuring device is installed with a direction of the display set to be easily seen by the user, the orientation direction of the antenna and the movement direction of the moving body no longer match, and measurement accuracy of a movement speed decreases.

SUMMARY

The present technology provides a speed measuring device for a moving body that can ensure both visibility of a display and measurement accuracy of a movement speed under various measurement conditions.

Module The speed measuring device for a moving body of the present technology includes: an antenna having directionality that transmits a transmission wave toward a moving body based on a supplied transmission signal and generates a reception signal by receiving a reflected wave reflected by the moving body; a Doppler sensor that supplies the transmission signal to the antenna and generates a Doppler signal having a Doppler frequency based on the reception signal; a measurement processing unit that calculates a movement speed of the moving body based on the Doppler signal; a display that displays display contents including the calculated movement speed; a housing that holds at least the display; and an antenna supporting unit provided on the housing that supports the antenna so that an inclination of an imaginary axis can be altered when an imaginary line extending along a direction where a gain of the antenna is maximized is defined as the imaginary axis that indicates an orientation direction of the antenna.

According to the present technology, because the antenna supporting unit that supports the antenna so that the inclination of the imaginary axis of the antenna can be altered is provided on the housing that holds the display, the display can be put in a posture a user can easily view and the movement direction of the moving body and the imaginary axis of the antenna can be matched. Because of this, both visibility of the display and measurement accuracy of the movement speed of the moving body can be ensured under various measurement conditions.

DETAILED DESCRIPTION (First Embodiment)

Figure 1:
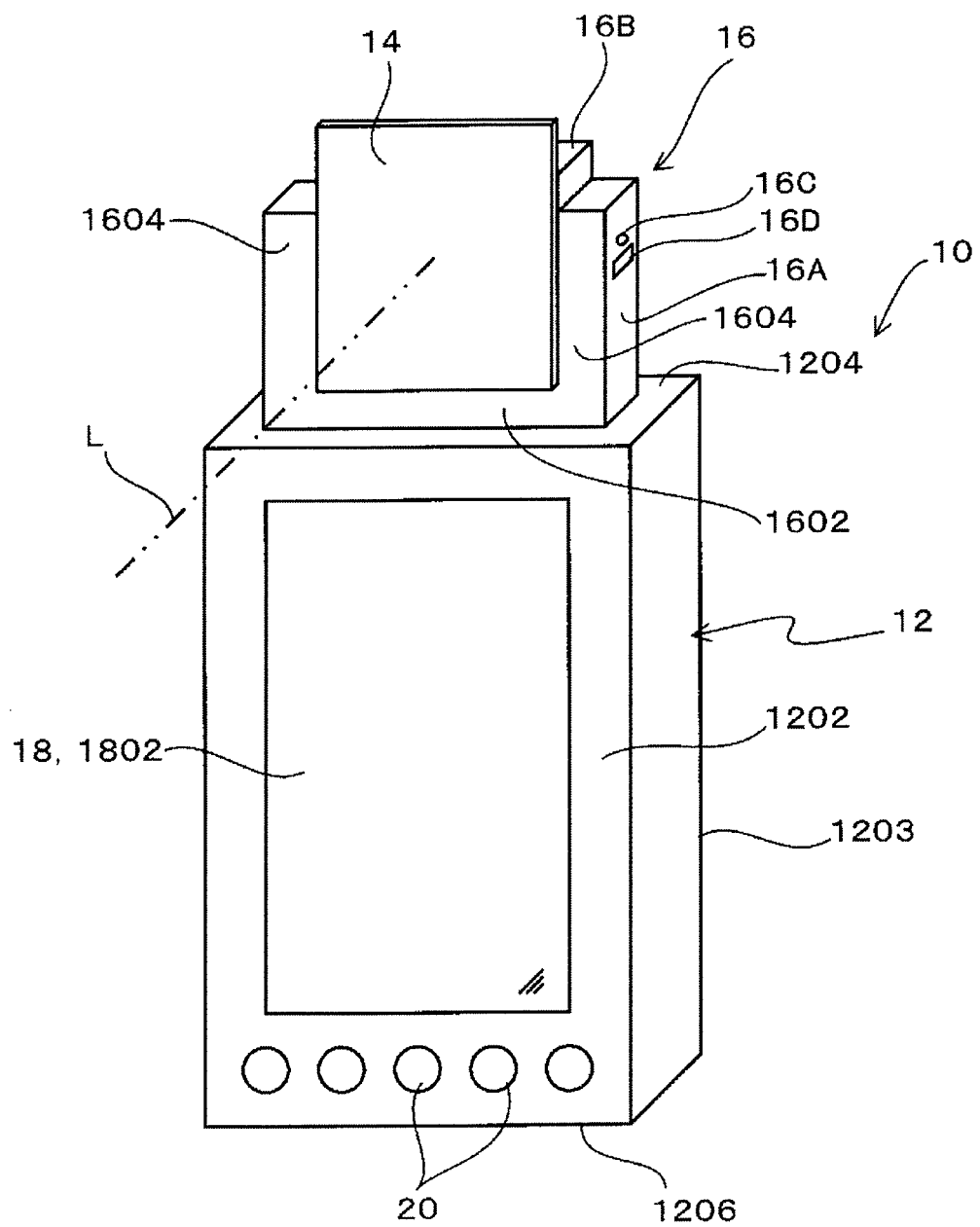
FIG. 1 is a perspective view illustrating a visual appearance of a speed measuring device 10 according to a first embodiment.
Figure 2:
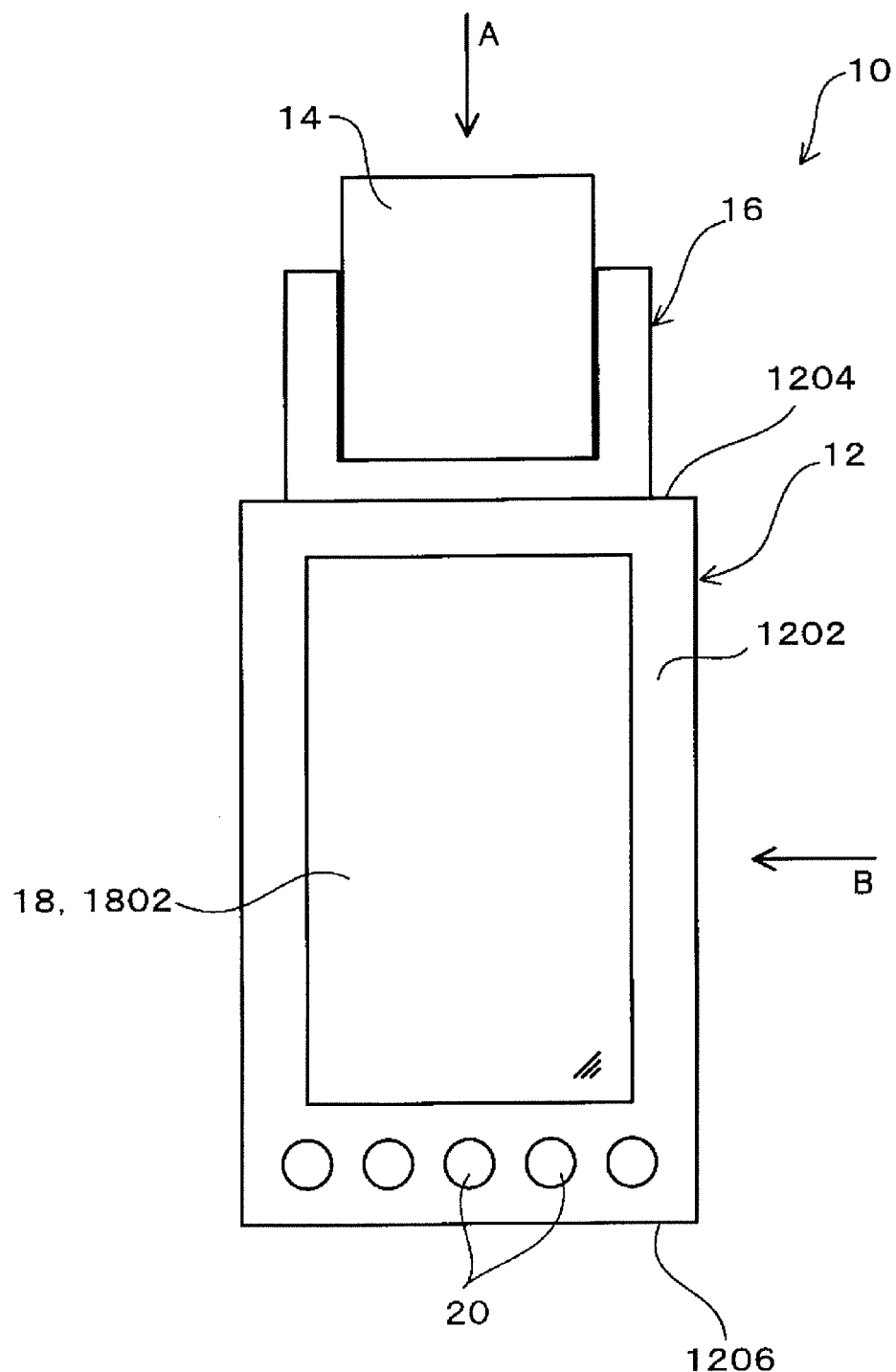
FIG. 2 is a front view of the speed measuring device 10 according to the first embodiment.
Figure 3:
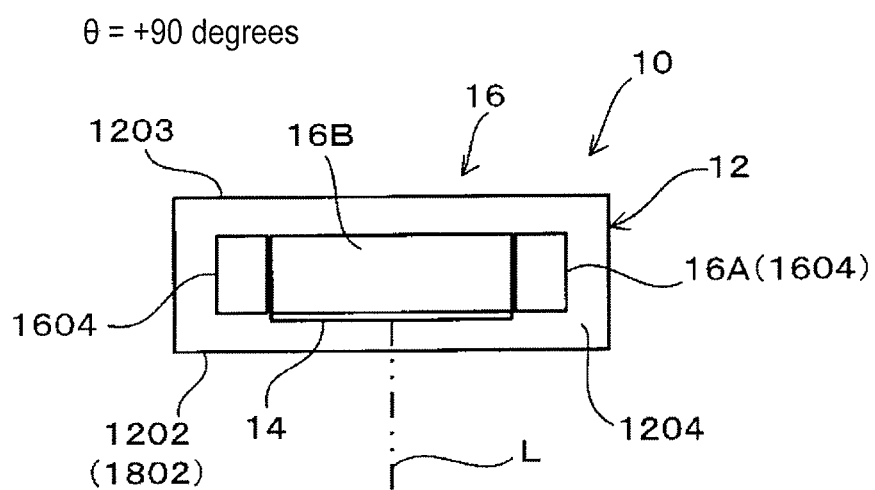
FIG. 3 is a view along arrow A in FIG. 2.

Next, embodiments of the present technology will be described while referring to the drawings.

As illustrated in FIG. 1, a speed measuring device 10 for a moving body (referred to hereinafter simply as a speed measuring device 10) is configured including a housing 12, an antenna 14, an antenna supporting unit 16, a display 18, and an operating unit 20.

The housing 12 has a thickness in an up-down direction, a width in a left-right direction of a greater dimension than the thickness, and a length in a front-back direction of a greater dimension than the width, and exhibits a rectangular plate shape.

An upper surface 1202 of the housing 12 exhibits a substantially rectangular shape whose longitudinal direction is parallel to the front-back direction of the housing 12.

A front and back of the upper surface 1202 are each connected to a front surface 1204 and a rear surface 1206 of the housing 12.

Moreover, on a lower surface 1203 opposing the upper surface 1202, a female screw (camera screw) that is not illustrated is provided for attaching the speed measuring device 10 on a fixture such as a tripod.

The antenna 14 is coupled to the upper surface 1202 of the housing 12 via the antenna supporting unit 16.

The antenna 14 has directionality, transmits a transmission wave toward the moving body based on a transmission signal supplied from a Doppler sensor 22 (FIG. 6) that will be described below, and receives a reflected wave reflected by the moving body to generate and supply to the Doppler sensor 22 a reception signal.

In the present specification, an imaginary line extending along a direction in which a gain of the antenna 14 is maximized is defined as an imaginary axis L that indicates an orientation direction of the antenna.

In this embodiment, the antenna 14 is configured by a patch antenna of a rectangular plate shape and has a top surface which is one surface in a thickness direction transmits the transmission wave and receives the reflected wave, and an opposite side of the top surface is a rear surface.

Moreover, because the patch antenna is used as the antenna 14, this is advantageous in making a size of the speed measuring device 10 smaller. However, various conventionally known antennas such as a horn antenna can be used as the antenna 14.

Note that if an orientation angle of the antenna 14 is too narrow, there is a disadvantage where a measurement range of the moving body is limited, and if the orientation angle of the antenna 14 is too wide, unnecessary reflected waves are received from objects other than the moving body to be measured, which is disadvantageous in ensuring measurement accuracy.

Because of this, it is advantageous to make the orientation angle of the antenna 14 be from 5 to 90 degrees to ensure the measurement range of the moving body and to suppress reception of unnecessary reflected waves from objects other than that to be measured.

The antenna supporting unit 16 is provided on the housing 12 and supports the antenna 14 so that an inclination of the imaginary axis L can be altered.

In this embodiment, the antenna supporting unit 16 is provided with a frame 16A and a case 16B.

The frame 16A is configured by a base portion 1602 that is provided on the front surface 1204 of the housing 12 and that extends in a width direction of the housing 12, and two pillar portions 1604 erected forward from both ends of the base portion 1602.

The case 16B exhibits a rectangular plate shape slightly smaller than a contour of the antenna 14 when viewed from above and is attached to a back surface of the antenna 14 in a state where four sides of the case 16B are parallel to four sides of the antenna 14.

More specifically, the case 16B has a bottom wall of a rectangular plate shape opposing the antenna 14 and four side walls erected from the bottom wall, and an upper portion of these four side walls is connected to the back surface of the antenna 14. Moreover, the Doppler sensor 22 that will be described below is housed in a housing space surrounded by the bottom wall, the four side walls, and the antenna 14.

Moreover, a unitary module that is unitarily provided with the antenna 14 and the Doppler sensor 22 may also be used. In this situation, the Doppler sensor 22 is unitarily provided on the back surface of the antenna 14.

Using such a unitary module is advantageous in reducing noise applied to a signal by reducing a distance of a signal path between the antenna 14 and the Doppler sensor 22 and advantageous in making the size of the speed measuring device 10 smaller.

Note that the Doppler sensor 22 may be housed in the housing 12.

The case 16B has two opposing side walls out of the four disposed between the two pillar portions 1604 and is rotatably supported by the two pillar portions 1604 via a support shaft 16C whose axis faces the left-right direction of the housing 12.

Therefore, the antenna supporting unit 16 supports the antenna 14 so that the inclination of the imaginary axis L can be altered.

Figure 4:
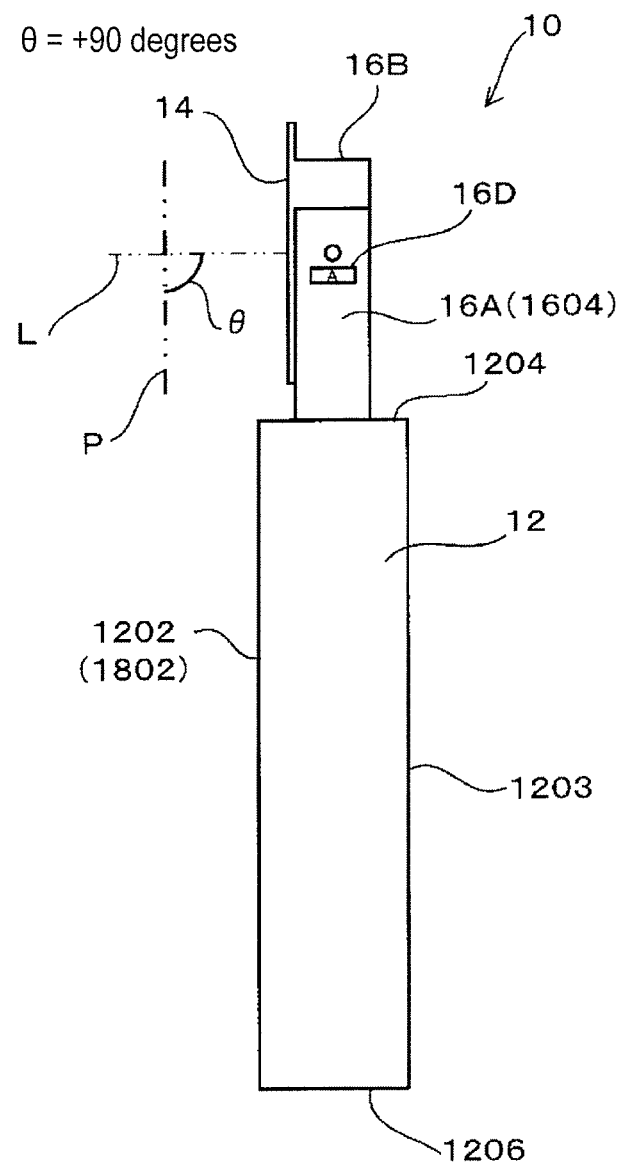
FIG. 4 is a view along arrow B in FIG. 2.

In the present specification, as illustrated in FIG. 4, an angle that is formed by the imaginary axis L and an imaginary plane P, which is parallel to the display surface

1802 of the display 18 that will be described below, is defined as an antenna angle θ. In this embodiment, the antenna supporting unit 16 supports the antenna 14 so that the antenna angle θ changes in a range of ±90 degrees. That is, the antenna angle θ changes in a range of 180 degrees. Note that an adjustment range of the antenna angle θ is not limited to 180 degrees, and the adjustment range may be set to any range.

Figure 5:
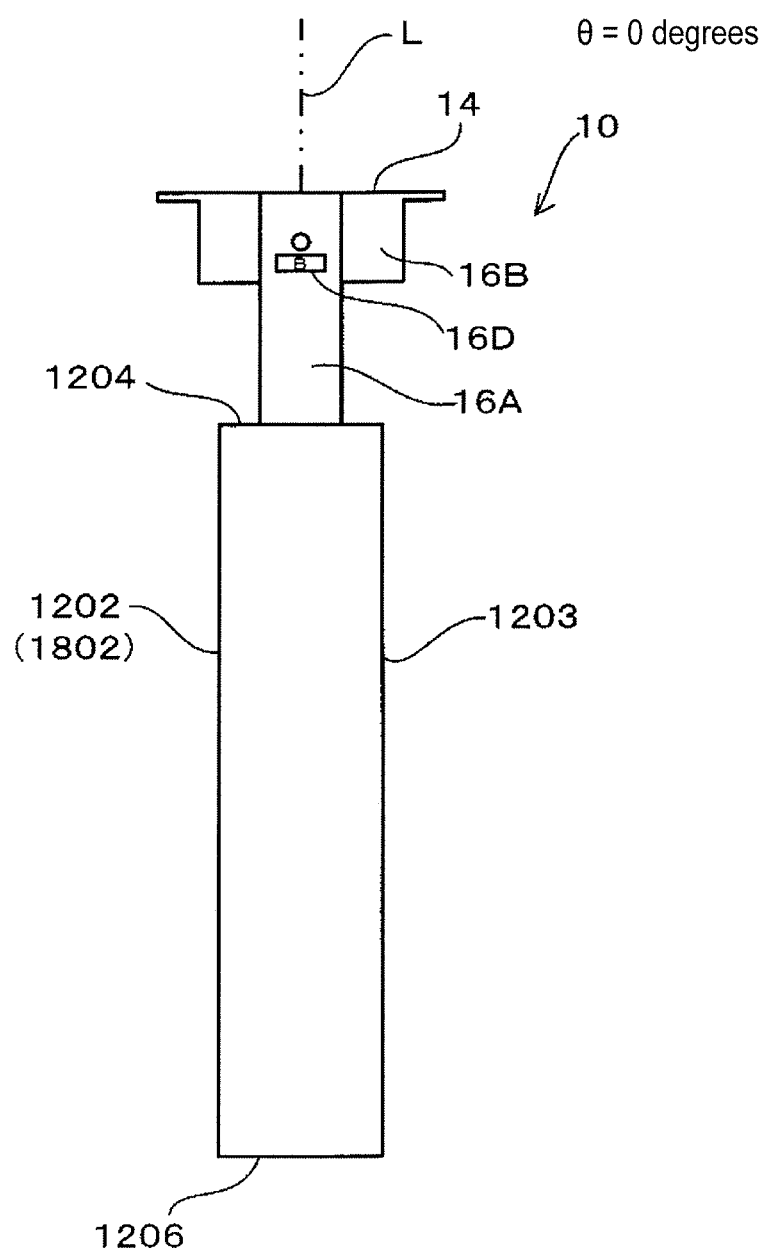
FIG. 5 is a diagram illustrating a state where the antenna in FIG. 4 is rotated 90 degrees.

Here, as illustrated in FIG. 4, the antenna angle θ=+90 degrees in a state where the imaginary axis L faces above the housing 12; as illustrated in FIG. 5, the antenna angle θ=0 degrees in a state where the imaginary axis L faces the front of the housing 12; and the antenna angle θ=−90 degrees in a state where the imaginary axis L faces the rear of the housing 12; therefore, the adjustment range of the antenna angle θ is ±90 degrees.

Note that in this embodiment, a situation where the antenna supporting unit 16 rotatably supports the antenna 14 around a unitary support shaft 16C is described, but it is sufficient that the antenna supporting unit 16 is able to support the antenna 14 so that the inclination of the imaginary axis L can be altered, and various conventionally known mechanisms can be used as the antenna supporting unit 16.

For example, a configuration may be one where the antenna supporting unit 16 rotatably supports the antenna 14 around two support shafts by further providing a separate support shaft that extends along a plane orthogonal to the support shaft 16C. This is more advantageous in ensuring degrees of freedom in adjusting the inclination of the imaginary axis L of the antenna 14.

Furthermore, in this embodiment, the antenna supporting unit 16 is provided with a click mechanism that holds the antenna 14 at a predetermined plurality of antenna angles θ, for example, three angles of +90 degrees, 0 degrees, and −90 degrees. By this, a setting operation to the predetermined plurality of antenna angles θ is made easier.

Moreover, in this embodiment, as illustrated in FIGS. 4 and 5, an angle display 16D that indicates on which of the predetermined plurality of antenna angles θ the antenna is positioned is provided on the antenna supporting unit 16. By this, confirmation of the antenna angle θ is made easier.

The angle display 16D is configured by a window portion provided on one of the pillar portions 1604 and an indicator provided on a location on the case 16B.

The indicator is formed by symbols such as A, B, and C; numbers; or scale marks on locations on the case 16B corresponding to where the antenna angle θ is +90 degrees, 0 degrees, and −90 degrees.

When the antenna angle θ of the antenna 14 is switched to +90 degrees, 0 degrees, or −90 degrees, respectively, the indicators of A, B, and C formed on the location on the case 16B are selectively exposed through the window portion, thereby indicating on which of the plurality of antenna angles θ the antenna 14 is positioned.

Note that various conventionally known display mechanisms can be used as such an angle display 16D.

The display 18 is provided on the upper surface 1202 of the housing 12 with the flat display surface 1802 of a rectangular shape facing up, and most of the upper surface 1202 is occupied by the display surface 1802.

In this embodiment, the display surface 1802 exhibits a rectangular shape whose length along the front-back direction of the housing 12 is longer than a width along the left-right direction of the housing 12.

The display 18 displays various display contents, including the movement speed of the moving body, which is the measurement result, in the form of numbers, symbols, icons, or the like.

As such a display 18, a flat panel display such as a liquid crystal panel can be used.

The operating unit 20 is provided on a location on the upper surface 1202 near the rear surface 1206.

In this embodiment, the operating unit 20 is configured including a plurality of operation buttons, including a mode selection button and a power button.

The mode selection button is for selecting a measurement mode of the speed measuring device 10 to a golf mode, a bat mode, or a ball mode, which will be described below.

The power button is for turning power on and off.

Note that a posture of the housing 12 when using the speed measuring device 10 is not limited in particular but is normally (1) a posture where the upper surface 1202 (display surface 1802) of the housing 12 faces up or (2) a posture where the front surface 1204 of the housing 12 faces up and the upper surface 1202 (display surface 1802) faces to the side, and the antenna angle θ is adjusted so that the imaginary axis L of the antenna 14 matches the movement direction of the moving body.

Next, a configuration of a control system of the speed measuring device 10 will be described while referring to FIG. 6.

The speed measuring device 10 is configured including the Doppler sensor 22, a measurement processing unit 24, and the like in addition to the antenna 14, the display 18, and the operating unit 20.

The Doppler sensor 22 is connected to the antenna 14 by a cable that is not illustrated, supplies the transmission signal to the antenna 14 via the cable, and detects the Doppler signal Sd by accepting the reception signal supplied from the antenna 14.

The Doppler signal is a signal that has a Doppler frequency Fd defined by a frequency F1-F2, which is the difference between a frequency F1 of the transmission signal and a frequency F2 of the reception signal.

Various commercially available sensors can be used as a Doppler sensor 22.

Note that as the transmission signal, a microwave of 24 GHz or 10 GHz can be used, for example, and the frequency of the transmission signal is not limited if able to obtain the Doppler signal Sd.

Figure 6:
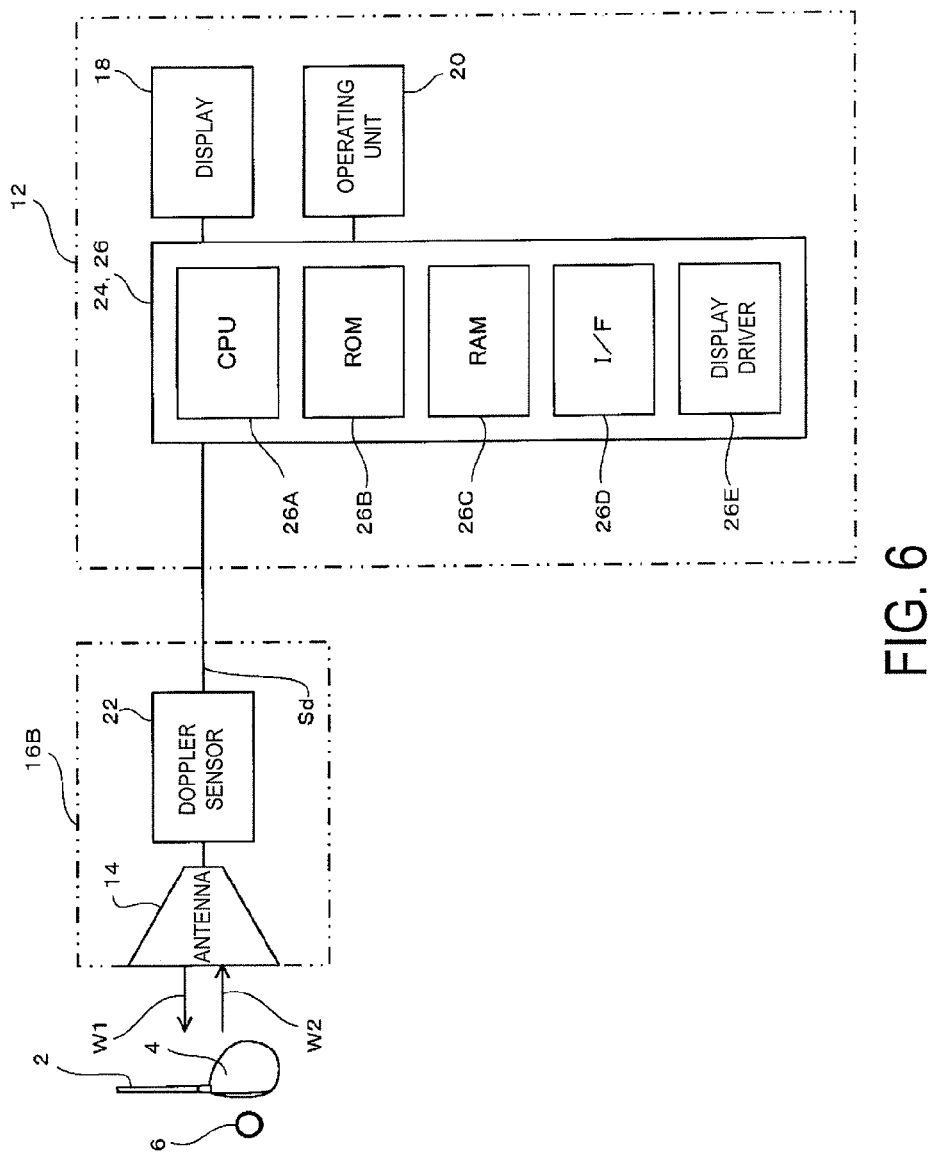
FIG. 6 is a block diagram illustrating a configuration of the speed measuring device 10 according to the first embodiment.

Note that in FIG. 6, the reference numeral 2 illustrates a golf club, the reference numeral 4 illustrates a golf club head as the moving body, and the reference numeral 6 illustrates a golf ball as the moving body.

Here, a principle of speed detection of the moving body using the Doppler sensor 22 will be described.

As known conventionally, the Doppler frequency Fd is expressed by Formula (1).

$$Fd = F1 - F2 = 2 \cdot V \cdot F1/c \tag{1}$$

wherein V: speed of the moving body, c: speed of light (3·108 m/s).

Thus, when Formula (1) is solved for V, Formula (2) is arrived at.

$$V = c \cdot Fd/(2 \cdot F1) \tag{2}$$

Therefore, the speed V of the moving body is proportional to the Doppler frequency Fd.

Next, a measurement result of the Doppler frequency Fd when the golf club head 4 and the golf ball 6 are detected by the Doppler sensor 22 will be described.

Figure 8:
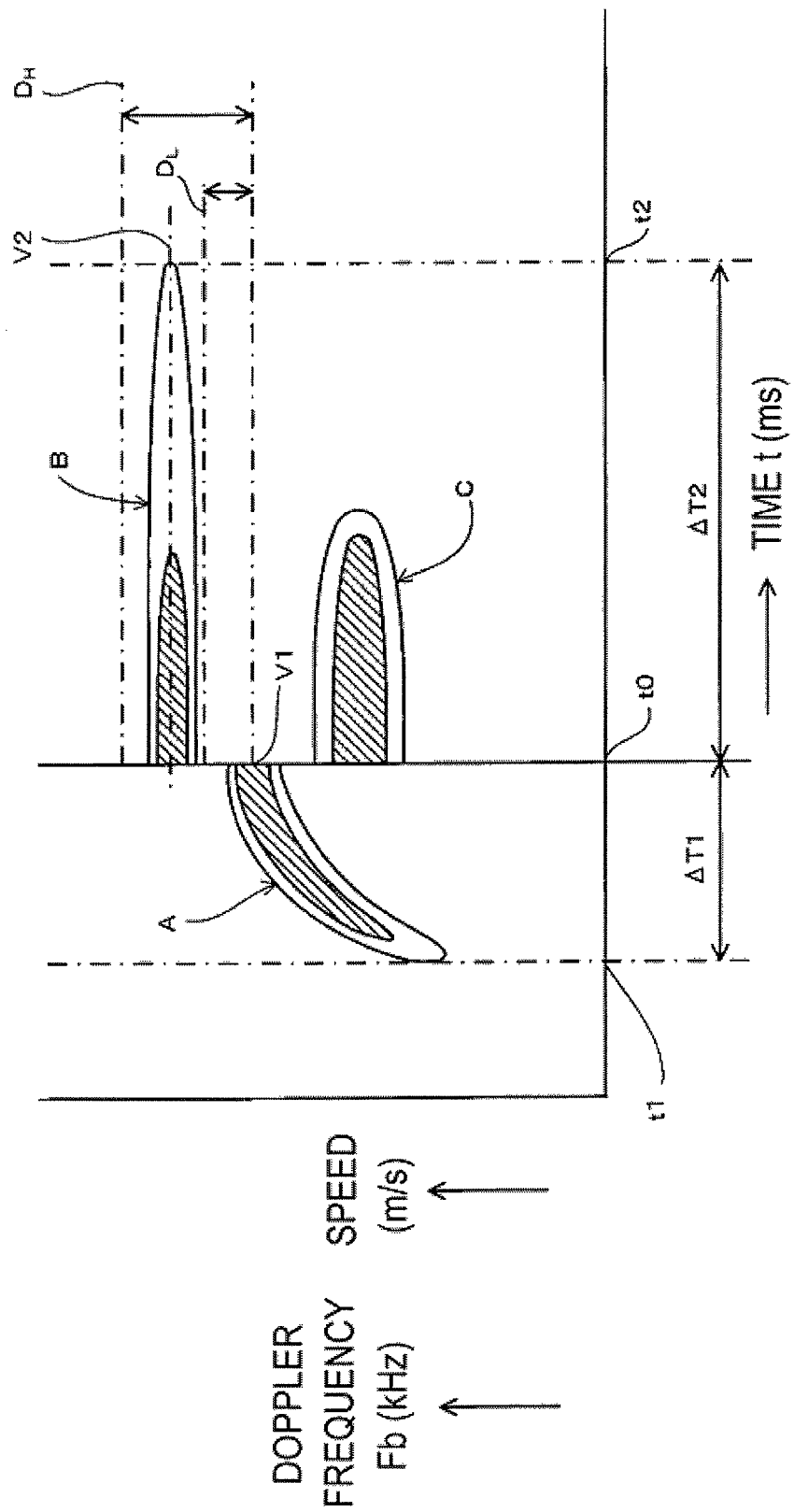
FIG. 8 is a diagram showing a result of wavelet analyzing a Doppler signal Sd.

FIG. 8 is a diagram showing a result of wavelet analyzing the Doppler signal Sd.

The horizontal axis indicates a time t (ms), and the vertical axis indicates the Doppler frequency Fd (Hz) and the speed V (m/s) of the moving body.

Such a diagram is obtained by, for example, sampling the Doppler signal Sd, taking in the signal to a digital oscilloscope, converting the signal into digital data, and wavelet analyzing or continuous FFT analyzing the digital data using a personal computer or the like.

FIG. 8 shows a process before and after the golf ball 6 mounted on a tee is struck by the swung golf club head 4.

A frequency distribution (speed distribution) indicated by the reference numeral A shows a detection result of the Doppler frequency Fd (speed V) corresponding to the golf club head 4 during a period until the golf ball 6 is struck.

A frequency distribution (speed distribution) indicated by the reference numeral B shows a detection result of the Doppler frequency Fd (speed V) corresponding to the golf ball 6 during a period after the golf ball 6 is struck by the golf club head 4.

A frequency distribution (speed distribution) indicated by the reference numeral C shows a detection result of the Doppler frequency Fd (speed V) corresponding to the golf club head 4 during the period after the golf ball 6 is struck.

Note that in the frequency distributions A, B, and C shown in FIG. 8, the hatched portion indicates that an intensity of the Doppler signal Sd is large and the portion indicated by the solid line indicates that the intensity of the Doppler signal Sd therein is less than that of the hatched portion.

The frequency distribution A indicates a process where the swung golf club head 4 is measured from a time point it enters a detection region of the Doppler sensor 22 and accelerates over time.

Moreover, the frequency distribution C indicates a process where the golf club head 4 rapidly decelerates due to striking the golf ball 6.

Moreover, the frequency distribution B indicates a process where the golf ball 6 struck by the golf club head 4 is driven out at a higher speed than a maximum speed of the golf club head 4 in the frequency distribution A, and moves at substantially a constant speed.

The following observations can be obtained from FIG. 8.

(1) The movement speed V (Doppler frequency Fd) of the golf club head 4 greatly decelerates by striking the golf ball 6.

That is, a change amount per unit time of the movement speed V (Doppler frequency Fd) of the golf club head 4 greatly changes when the golf ball 6 is struck.

The maximum speed (so-called head speed) of the golf club head 4 is a maximum speed of the movement speed V of the golf club head 4 in the period before striking.

That is, the maximum speed of the gold club head 4 is a movement speed corresponding to the maximum frequency of the Doppler frequency Fd in the frequency distribution A in FIG. 8.

(2) The movement speed V (Doppler frequency Fd) of the golf ball 6 can be deemed substantially a constant speed after being struck by the golf club head 4.

An initial speed of the golf ball 6 becomes a movement speed corresponding to the Doppler frequency Fd in the frequency distribution B in FIG. 8.

(3) Therefore, the maximum speed of the golf club head 4 can be measured by deciding the frequency distribution A and finding a maximum speed in the frequency distribution A.

Furthermore, the initial speed of the golf ball 6 can be measured by deciding the frequency distribution B and finding an average speed in the frequency distribution B.

In this embodiment, based on such observations, the movement speeds of these moving bodies are accurately measured based on changes in the movement speeds of the moving bodies having different trends and characteristics according to the moving body.

Description will be continued by returning to FIG. 6.

The measurement processing unit 24 calculates the movement speed of the moving body (golf club head 4, golf ball 6) by receiving the Doppler signal Sd supplied from the Doppler sensor 22 and performing a calculation process.

In this embodiment, the measurement processing unit 24 is configured by a microcomputer 26.

The microcomputer 26 is configured including a CPU 26A, and a ROM 26B, a RAM 26C, an interface 26D, a display driver 26E, and the like which are connected to the CPU 26A via an interface circuit and a bus line, which are not illustrated.

The ROM 26B stores a control program or the like executed by the CPU 26A for calculating the movement direction and the movement speed of the moving body, and the RAM 26C provides a working area.

The interface 26D receives and supplies to the CPU 26A the Doppler signal Sd and also accepts and supplies to the CPU 26A the operation signal from the operating unit 20.

The display driver 26E drives the display 18 based on a control by the CPU 26A.

Figure 7:
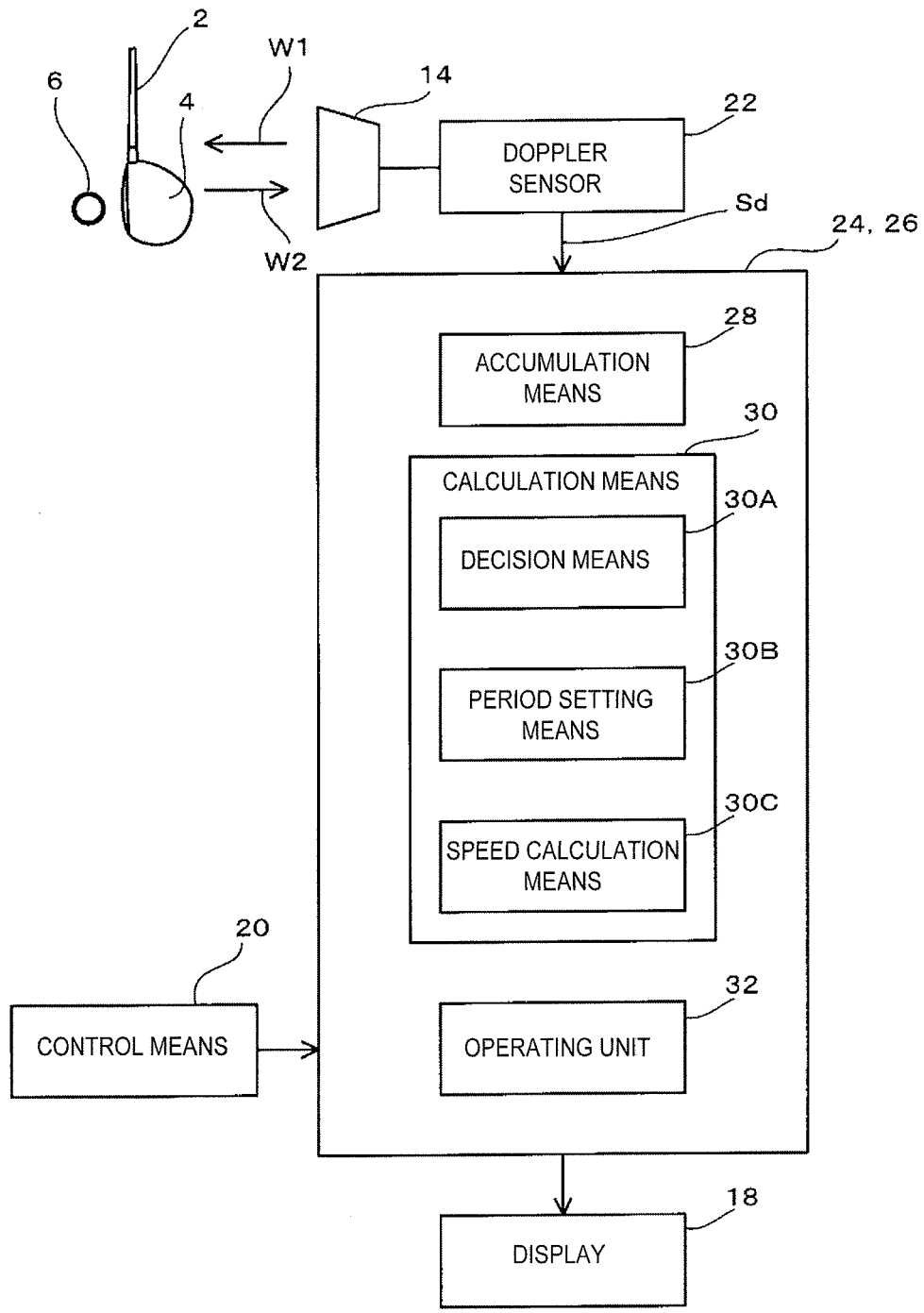
FIG. 7 is a functional block diagram of the speed measuring device 10 according to the first embodiment.

FIG. 7 is a block diagram of the speed measuring device 10 that illustrates a configuration of the microcomputer 26 with functional blocks.

The microcomputer 26 is functionally configured including an accumulation module 28, a calculation module 30, and a control module 32.

Moreover, the accumulation module 28, the calculation module 30, and the control module 32 are realized by the CPU 26A executing the control program, but these components may be configured by hardware such as a circuit.

The accumulation module 28 samples the Doppler signal Sd with a predetermined sampling period, converts the signal into intermediate data made to correspond to the Doppler frequency Fd, and accumulates the signal in order over time, and in this embodiment, the intermediate data is accumulated in the RAM 26C.

Note that the intermediate data can be generated as below.

(1) The Doppler signal Sd is binarized to generate a binarized signal, and this binarized signal is counted using a counter to find a period of the binarized signal, and this period is sampled as the intermediate data.

In this situation, a value of the intermediate data and the Doppler frequency Fd are inversely proportional.

(2) The frequency of the Doppler frequency Fd is found as the intermediate data, and this data of the frequency is sampled as the intermediate data.

In this situation, the intermediate data indicates the Doppler frequency Fd itself.

Note that in this embodiment, a situation where the intermediate data is obtained by method (1) will be described. If obtaining the intermediate data by method (2), there are disadvantages such as a configuration of a processing circuit becoming complex due to performing FFT conversion as signal processing and the like, and a processing time becoming long. As opposed to this, as in this embodiment, using the data of the period as the intermediate data is also advantageous in simplifying the configuration of the processing circuit and reducing the processing time.

The calculation module 30, based on the accumulated intermediate data, detects a boundary point where a rapid change in the movement speed of the moving body occurs, and finds a first speed data as a maximum speed of the movement speed during a first period before the boundary point and a second speed data as an average speed of the movement speed during a second period after the boundary point.

The calculation module 30 will be specifically described.

The calculation module 30 is provided with a decision module 30A, a period setting module 30B, and a speed calculation module 30C.

The decision module 30A decides whether or not the movement speed of the moving body rapidly decelerated by deciding whether or not the intermediate data accumulated in the accumulation module 28 increased or decreased a numeric value N times (N is a natural number greater than or equal to 2) consecutively over time.

In this embodiment, because the intermediate data indicates the period, whether or not the movement speed of the moving body rapidly decelerated is decided by deciding whether or not the intermediate data increased the numeric value N times (N is the natural number greater than or equal to 2) consecutively over time.

That is, when the moving body is the two moving bodies of the golf club head 4 and the golf ball 6, when the golf club head 4 moves and strikes the golf ball 6 in a resting state, the movement speed of the golf club head 4 rapidly decreases with a striking time point as a boundary, driving out the golf ball 6.

That is, the decision module 30A decides whether or not the movement speed of a first moving body rapidly decelerated due to the first moving body striking a second moving body.

Note that when the golf club head 4 strikes the golf ball 6, the head speed decelerates about 1 to 10 m/s.

Furthermore, the following configuration may also be used as the decision module 30A.

That is, the decision module 30A decides whether or not the movement speed of the moving body rapidly decelerated by deciding whether or not an absolute value of a change amount per unit time of the intermediate data accumulated in the accumulation module 28 exceeded a predetermined threshold.

However, if the decision module 30A decides whether or not the intermediate data accumulated in the accumulation module 28 increased or decreased the numeric value N times consecutively over time, this is more advantageous in that noise included in the intermediate data is suppressed from affecting a decision result. Here, the noise included in the intermediate data is due to noise included in the Doppler signal Sd.

The period setting module 30B performs the following operation if the decision result by the decision module 30A is positive.

That is, the period setting module 30B, as illustrated in FIG. 8, defines as a boundary point t0 a time point when the intermediate data increases or decreases the numeric value N times consecutively.

The period setting module 30B sets a period from a sampling time point t1 of a leading data of the intermediate data to the boundary point t0 as a first period ΔT1 and a period from the boundary point t0 to a sampling time point t2 of a final data of the intermediate data as a second period ΔT2.

Note that if the decision module 30A decides whether or not the movement speed of the moving body rapidly decelerated by deciding whether or not the absolute value of the change amount per unit time of the intermediate data accumulated in the accumulation module 28 exceeded the predetermined threshold, the period setting module 30B defines as the boundary point t0 a time point when the absolute value of the change amount exceeds the threshold.

The speed calculation module 30C performs a first calculation operation that finds a first speed data V1 (FIG. 8) as the maximum speed based on a minimum value or a maximum value of the intermediate data in the first period ΔT1.

In this embodiment, because the intermediate data indicates the period, the speed calculation module 30C performs the first calculation operation that finds the first speed data V1 (FIG. 8) as the maximum speed based on the minimum value of the intermediate data in the first period ΔT1.

That is, when the golf ball 6 is struck with the golf club head 4, the first speed data V1 indicates the head speed of the golf club head 4.

Moreover, the speed calculation module 30C performs a second calculation operation that finds a second speed data V2 (FIG. 8) as an average speed based on an average value of the intermediate data in the second period ΔT2.

That is, when the golf ball 6 is struck with the golf club head 4, the second speed data V2 indicates the initial speed of the golf ball 6.

In this embodiment, the second calculation operation by the speed calculation module 30C is performed on the intermediate data corresponding to data between a predetermined upper limit value $D_H$ and lower limit value $D_L$ in the second period ΔT2.

The upper limit value $D_H$ is a value that multiplies the intermediate data corresponding to the first speed data V1 by a predetermined first coefficient k1, and the lower limit value $D_L$ is a value that multiplies the intermediate data corresponding to the first speed data V1 by a predetermined second coefficient k2, which is a value less than the first coefficient k1.

The first coefficient k1 and second coefficient k2 can be set, for example, from 1.1 to 1.9.

Performing the second calculation operation by the speed calculation module 30C on the intermediate data corresponding to the data between the upper limit value $D_H$ and the lower limit value $D_L$ is advantageous in suppressing the noise included in the intermediate data from affecting the second calculation operation.

Furthermore, the speed calculation module 30C, when the decision result by the decision module 30A is negative, performs a third calculation operation that finds a third speed data V3 as the maximum speed based on a minimum value or a maximum value of all of the intermediate data accumulated in the accumulation module 28.

In this situation, because the decision result by the decision module 30A is negative, a golf club 2 is being swung, but the golf club head 4 does not strike the golf ball 6, and a so-called practice swing is being performed.

Therefore, in this situation, the third speed data V3 becomes the head speed of the golf club head 4.

In this embodiment, because the intermediate data is data of the period, the speed calculation module 30C, when the decision result by the decision module 30A is negative, performs the third calculation operation that finds the third speed data V3 as the maximum speed based on the minimum value of all of the intermediate data accumulated in the accumulation module 28.

Furthermore, the speed calculation module 30C, when the decision result by the decision module 30A is negative, performs a fourth calculation operation that finds a fourth speed data V4 as the average speed based on an average value of all of the intermediate data accumulated in the accumulation module 28.

The fourth calculation operation is effective when measuring the movement speed of a ball when, for example, a baseball is pitched, instead of when the golf ball 6 is struck with the golf club head 4.

Therefore, in this situation, the fourth speed data V4 is a speed of the pitched baseball.

The control module 32 accepts the operation of the operating unit 20 and sets the measurement mode to the golf mode, the bat mode, or the ball mode.

That is, the control module 32 executes the first to fourth calculation operations by controlling the speed calculation module 30C according to the set measurement mode.

Moreover, the control module 32 displays the first to fourth speed data V1 to V4 on the display 18.

Next, an operation of the speed measuring device 10 will be described.

First, the moving body is the two moving bodies of the golf club head 4 and the golf ball 6, and a situation will be described where both the head speed of the golf club head 4 and the initial speed of the golf ball 6 are measured simultaneously as the movement speeds of these two moving bodies.

Figure 9:
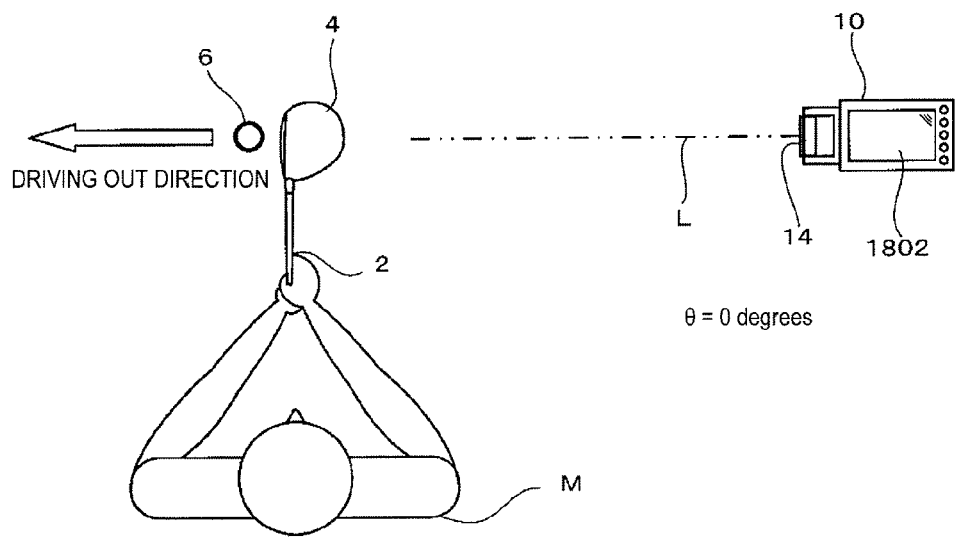
FIG. 9 is a top view that describes an installation state of the speed measuring device 10 when measuring a golf club head 4 and a golf ball 6 as moving bodies.
Figure 14:
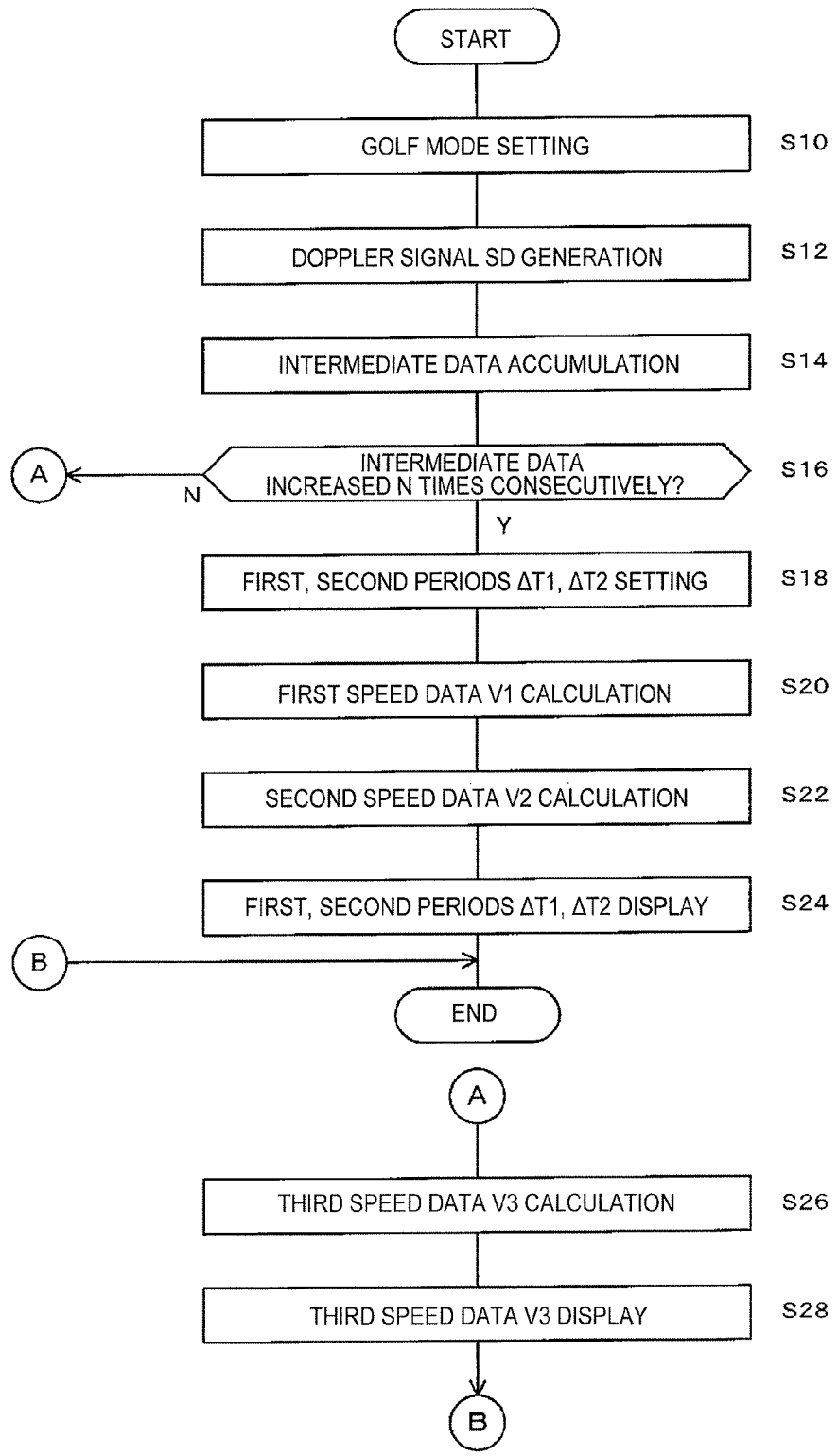
FIG. 14 is a flowchart showing an operation of the speed measuring device 10 when measuring the golf club head 4 and the golf ball 6 as the moving bodies.

FIG. 9 is a top view that describes an installation state of the speed measuring device 10 when measuring the golf club head 4 and the golf ball 6 as the moving bodies, and FIG. 14 is a flowchart showing the operation of the speed measuring device 10 when measuring the golf club head 4 and the golf ball 6 as the moving bodies.

As shown in FIG. 14, first, the user operates the mode selection button to select as the measurement mode of the speed measuring device 10 the golf mode from among the golf mode, the bat mode, and the ball mode, and the control module 32 accepts the operation of the mode selection button to set the golf mode (step S10). The golf mode is a mode that measures and displays both the first and second speed data V1 and V2.

Next, the user, as illustrated in FIG. 9, installs the speed measuring device 10 in a driving out direction of the golf ball 6 in a location, for example, about 1 to 1.5 m behind the golf ball 6.

That is, the front surface 1204 of the speed measuring device 10 is turned toward the driving out direction, the lower surface is turned toward the ground, and the upper surface 1202 and the display surface 1802 are turned upward. Then, the antenna angle θ of the antenna 14 is adjusted, and the imaginary axis L is turned toward the golf ball 6 so as to match the driving out direction.

In this situation, the antenna angle θ is, for example, 0 degrees.

The speed measuring device 10 may be mounted on the ground or installed via the fixture such as the tripod.

By this, a transmission wave W1 sent from the antenna 14 hits the golf ball 6 and the golf club head 4, and a reflected wave W2 becomes receivable by the antenna 14.

Moreover, a user M becomes able to easily view the display surface 1802.

Next, when the user M drives out the golf ball 6 with the golf club head 4 by gripping and swinging the golf club 2, the measurement operation by the speed measuring device 10 is executed.

Specifically, the transmission wave W1 is reflected by the golf club head 4 and the golf ball 6, the reflected wave W2 is received by the Doppler sensor 22, and the Doppler signal Sd is generated by the Doppler sensor 22 (step S12).

The Doppler signal Sd is sampled with the sampling period by the accumulation module 28, converted into the intermediate data made to correspond with the Doppler frequency Fd, and accumulated in the accumulation module 28 as time series data (step S14).

Next, the decision module 30A decides whether or not the intermediate data accumulated in the accumulation module 28 increased the numeric value N times (N is the natural number greater than or equal to 2) consecutively over time (step S16).

If step S16 is positive, the first period ΔT1 and the second period ΔT2 are set by the period setting module 30B based on the intermediate data accumulated in the accumulation module 28 (step S18).

Next, by a control unit 44 controlling the speed calculation module 30C based on the golf mode being set in step S10, the speed calculation module 30C executes the first calculation operation that finds the first speed data V1 and the second calculation operation that finds the second speed data V2 (steps S20, S22).

The control module 32 displays the first speed data V1 as the head speed on the display surface 1802, displays the second speed data V2 as the ball initial speed on the display surface 1802 (step S24), and ends the measurement operation.

Meanwhile, if step S16 is negative, the speed calculation module 30C performs the third calculation operation that finds the third speed data V3 (step S26).

That is, if step S16 is negative, the golf club 2 is being swung, but the golf club head 4 does not strike the golf ball 6, and the so-called practice swing is being performed.

Therefore, in this situation, it is sufficient that only the third speed data V3 is measured and displayed as the head speed of the golf club head 4.

Next, the control module 32 displays the third speed data V3 as the head speed on the display surface 1802 (step S28) and ends the measurement operation.

Note that in the golf mode, a unit of speed displayed on the display surface 1802 is set to either m/s or MPH.

Note that the first and second speed data V1 and V2 or the third speed data V3 may be displayed in any display form.

Specifically, by performing on the operating unit 20 an operation to set the display mode for selecting the display form, the control module 32 accepts this operation, and it is sufficient that one or both of the first and second speed data V1 and V2 are displayed.

Note that an initial speed efficiency R may be calculated by the control module 32 and displayed along with the first speed data V1 on the display 18.

Here, the initial speed efficiency R, as indicated by Formula (3), corresponds to a ratio of the second speed data V2 with respect to the first speed data V1.

$$R = (V2/V1) \quad (3)$$

Moreover, as indicated in Formula (4), a ratio of the initial speed efficiency R with respect to a predetermined maximum value Rm (theoretical maximum efficiency) of the initial speed efficiency R is calculated as an impact efficiency Ip, and this impact efficiency Ip may be displayed along with the first speed data V1 on the display 18.

$$Ip = (R/Rm) \times 100(\%) \quad (4)$$

Numeric value examples are as follows.
V1:40 m/s, V2:60 m/s, R:1.5, Ip:100%
V1:40 m/s, V2:55 m/s, R:1.38, Ip:92%
(wherein, Rm=1.5)

Next, a situation where the moving body is a baseball bat or the like and a speed of a swing of the baseball bat is measured by the speed measuring device 10 will be described.

However, in this example, a situation will be described where the baseball mounted on the tee is struck by the baseball bat, as in tee batting.

Figure 15:
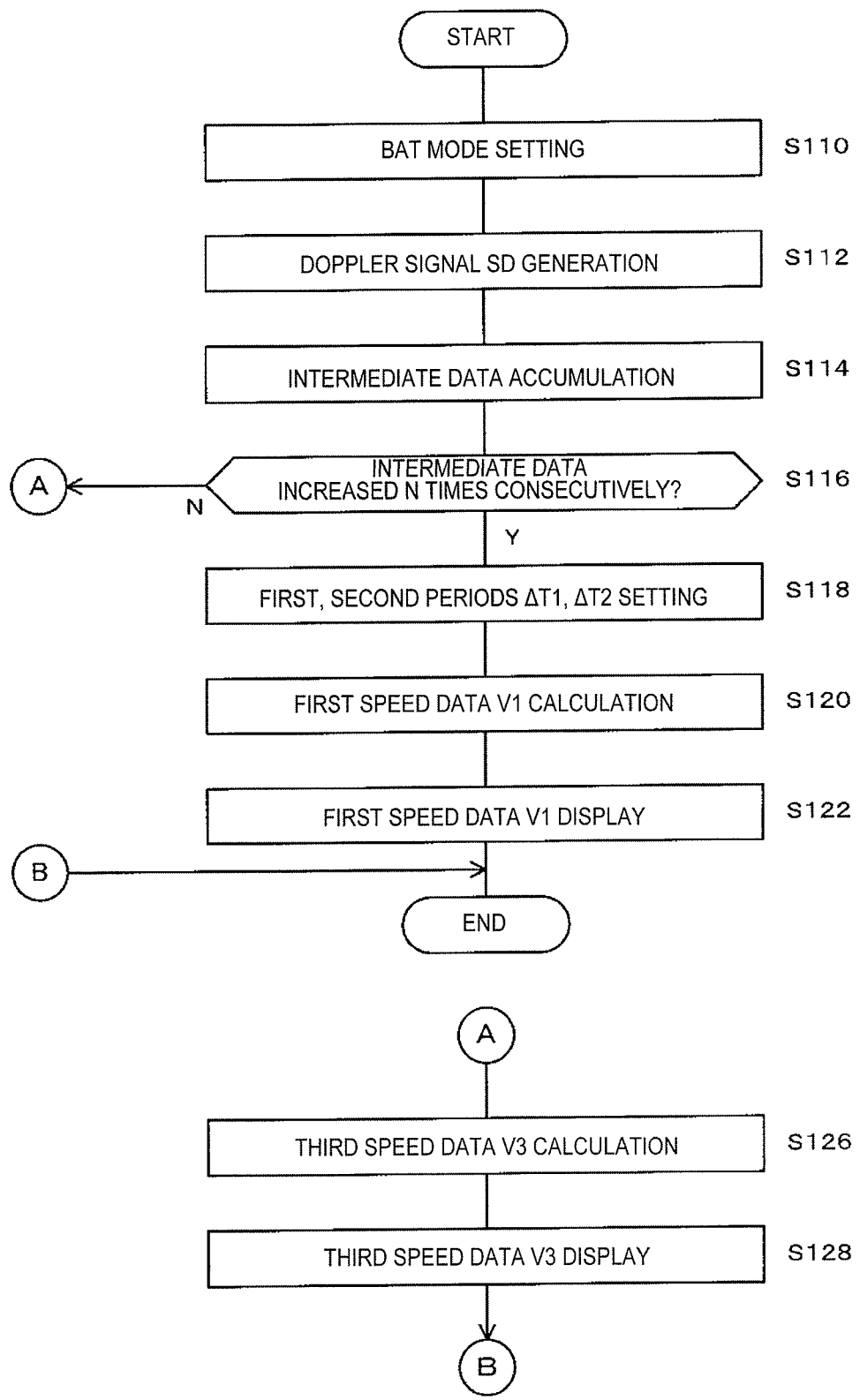
FIG. 15 is a flowchart showing an operation of the speed measuring device 10 when measuring the baseball bat 50 as the moving body.

FIG. 15 is a top view that describes an installation state of the speed measuring device 10 when measuring the baseball bat 50 as the moving body, and FIG. 15 is a flowchart showing an operation of the speed measuring device 10 when measuring the baseball bat 50 as the moving body.

Figure 10:
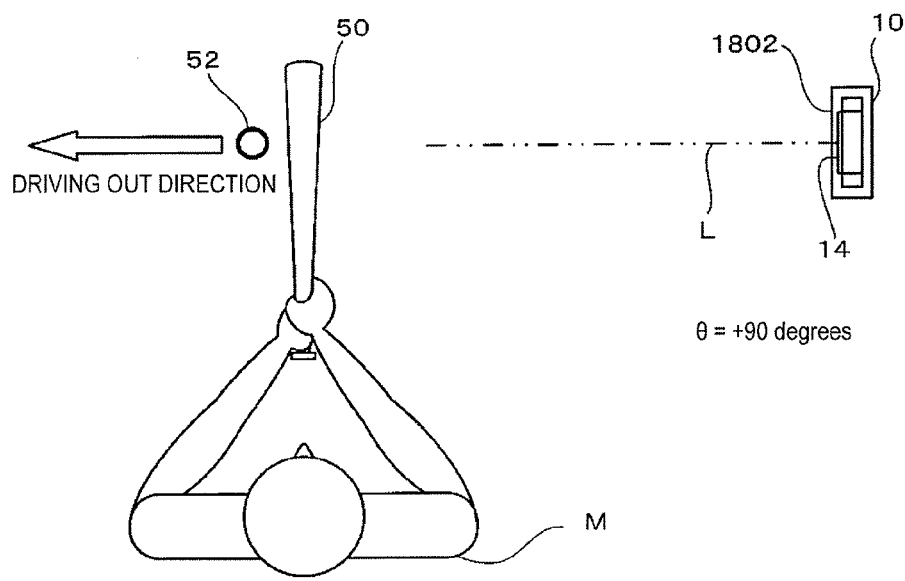
FIG. 10 is a top view that describes an installation state of the speed measuring device 10 when measuring a baseball bat 50 as the moving body.

As shown in FIG. 10, first, the user M operates the mode selection button to select as the measurement mode of the speed measuring device 10 the bat mode from among the golf mode, the bat mode, and the ball mode, and the control module 32 accepts the operation of the mode selection button to set the bat mode (step S110).

Next, the user M, as shown in FIG. 10, installs the speed measuring device 10 in a driving out direction of the ball 52 (in a direction along a straight line connecting a home base and a pitcher) mounted on the tee in a location, for example, about 1.5 to 2.0 m behind the ball 52.

That is, the upper surface 1202 (display surface 1802) of the speed measuring device 10 is turned toward the driving out direction, the front surface 1204 is turned upward, and the rear surface 1206 is turned toward the ground. Then, the antenna angle θ of the antenna 14 is adjusted, and the imaginary axis L is matched to the driving out direction.

In this situation, the antenna angle θ is, for example, +90 degrees.

The speed measuring device 10 may be mounted on the ground or installed via the fixture such as the tripod.

By this, the transmission wave W1 sent from the antenna 14 hits the bat 50, and the reflected wave W2 becomes receivable by the antenna 14.

Moreover, the user M becomes able to easily view the display surface 1802.

Next, when the user M drives out the ball 52 with the bat 50 by gripping and swinging the bat 50, the measurement operation by the speed measuring device 10 is executed.

Specifically, the transmission wave W1 is reflected by the bat 50 and the ball 52, the reflected wave W2 is received by the Doppler sensor 22, and the Doppler signal Sd is generated by the Doppler sensor 22 (step S112).

Description will be omitted below for processes of steps S114 and S116 because they are similar to those of steps S14 and S16 in FIG. 14.

If step S116 is negative, the speed calculation module 30C performs the third calculation operation that finds the third speed data V3 (step S126).

Next, the control module 32, similar to the situation in FIG. 14, displays the third speed data V3 as the swing speed on the display surface 1802 (step S128) and ends the measurement operation.

Note that in the bat mode, the unit of speed displayed on the display surface 1802 is set in advance to km/h by the control module 32.

Meanwhile, if step S116 is positive, steps S118 and S120 are executed. Description will be omitted below for processes of steps S118 and 120 because they are similar to those of steps S18 and S20 in FIG. 14.

Next, the control module 32 displays the first speed data V1 as the swing speed on the display surface 1802 (step S122) and ends the measurement operation.

Note that in the bat mode, the unit of speed displayed on the display surface is set to km/h.

A decision of step S116 will be described in more detail.

When a microwave is used as the transmission wave W1, in contrast to the reflected wave W2 being generated at the baseball bat 50, a majority of the transmission wave W1 is absorbed depending on a material of the baseball 52, which may decrease an intensity of the reflected wave W2.

Because of this, the Doppler signal Sd generated by the reflected wave W2 from the ball 52 is not recognized as an effective signal in the accumulation module 28, and, therefore, because the binarized signal is not detected, the decision of step S116 is negative, and steps S126 and S128 are executed.

However, if the Doppler signal generated by the reflected wave W2 from the ball 52 is recognized as the effective signal in the accumulation module 28 and the binarized signal is detected, an error included in the intermediate data accumulated in the accumulation module 28 becomes large.

If the third speed data V3 is found in this manner using the intermediate data that includes the error, accuracy of the third speed data V3 decreases.

Thus, if step S116 is positive, the first speed data V1 is measured using only the intermediate data of the first period ΔT1, and this first speed data V1 is displayed on the display surface 1802. By this, a speed of the bat 50 with an influence of the ball 52 removed can be accurately measured and displayed.

Note that when the bat 50 is measured as the moving body, a disposition of the speed measuring device 10 may be as below.

Figure 11:
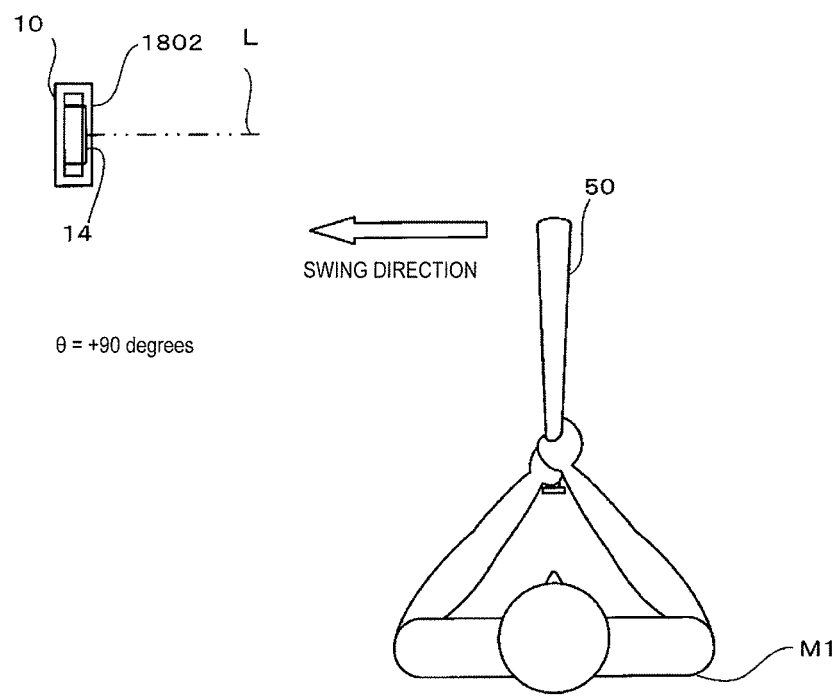
FIG. 11 is a top view that describes another example of the installation state of the speed measuring device 10 when measuring the baseball bat 50 as the moving body.

FIG. 11 is a top view that describes another example of the installation state of the speed measuring device 10 when measuring the baseball bat 50 as the moving body.

Moreover, speed is measured for a situation where a user M1 performs a practice swing with the bat 50.

In this situation, the user M1 installs the speed measuring device 10 in a swing direction of the bat 50 in a location, for example, about 1.5 m to 2.0 m in front of the user M1.

That is, the upper surface 1202 (display surface 1802) of the speed measuring device 10 is turned rearward, the front surface 1204 is turned upward, and the rear surface 1206 is turned toward the ground. Then, the antenna angle θ of the antenna 14 is adjusted, and the imaginary axis L is matched to an opposite direction (rearward) of the swing direction.

In this situation, the antenna angle θ is, for example, +90 degrees.

The speed measuring device 10 may be mounted on the ground or installed via the fixture such as the tripod.

By this, the transmission wave W1 sent from the antenna 14 hits the bat 50, and the reflected wave W2 becomes receivable by the antenna 14.

Moreover, the user M1 becomes able to easily view the display surface 1802.

Next, a situation where the moving body is a soccer ball and a speed of the ball shot by a foot F of the user M is measured by the speed measuring device 10 will be described.

Figure 12:
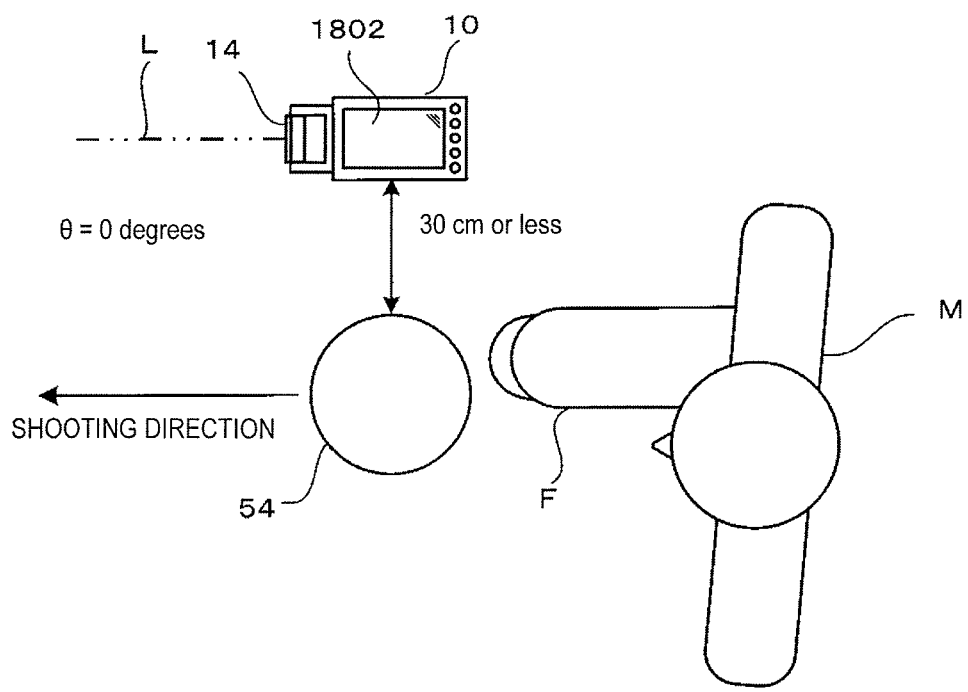
FIG. 12 is a top view that describes an installation state of the speed measuring device 10 when measuring a soccer ball 54 as the moving body.
Figure 16:
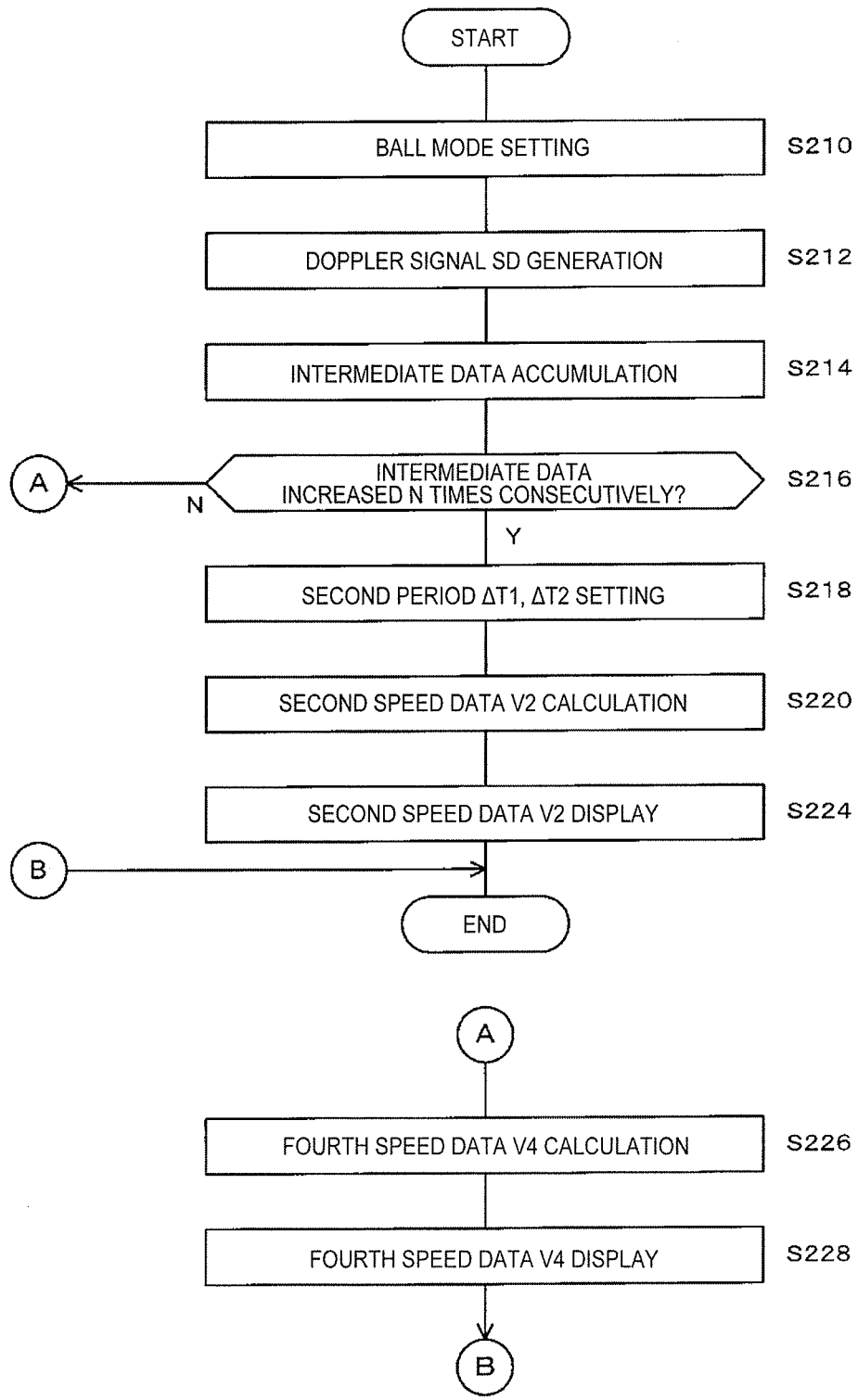
FIG. 16 is a flowchart showing an operation of the speed measuring device 10 when measuring the soccer ball 54 as the moving body.

FIG. 12 is a top view describing an installation state of the speed measuring device 10 when measuring the soccer ball 54 as the moving body, and FIG. 16 is a flowchart showing an operation of the speed measuring device 10 when measuring the soccer ball 54 as the moving body.

As shown in FIG. 16, first, the user M operates the mode selection button to select as the measurement mode of the speed measuring device 10 the ball mode from among the golf mode, the bat mode, and the ball mode, and the control module 32 accepts the operation of the mode selection button to set the ball mode (step S210).

Next, the user M, as illustrated in FIG. 12, installs the speed measuring device 10 in a direction orthogonal to a shooting direction of the ball 54 in a location, for example, away from the ball 54 by about 30 cm or less.

That is, the front surface 1204 of the speed measuring device 10 is turned toward the shooting direction, the lower surface is turned toward the ground, and the upper surface 1202 and the display surface 1802 are turned upward. Then, the antenna angle θ of the antenna 14 is adjusted, and the imaginary axis L is matched to the shooting direction.

In this situation, the antenna angle θ is, for example, 0 degrees.

The speed measuring device 10 may be mounted on the ground or installed via the fixture such as the tripod.

By this, the transmission wave W1 sent from the antenna 14 hits the ball 54, and the reflected wave W2 becomes receivable by the antenna 14.

Moreover, the user M becomes able to easily view the display surface 1802.

Next, when the user M kicks out the ball 54 with the foot F, the measurement operation by the speed measuring device 10 is executed.

Specifically, the transmission wave W1 is reflected by the foot F of the user M and the ball 54, the reflected wave W2 is received by the Doppler sensor 22, and the Doppler signal Sd is generated by the Doppler sensor 22 (step S212).

Description will be omitted below for processes of steps S214 and S216 because they are similar to those of steps S14 and S16 in FIG. 14.

If step S216 is negative, the speed calculation module 30C performs the fourth calculation operation that finds the fourth speed data V4 (step S226).

Next, the control module 32 displays the fourth speed data V4 as the ball speed on the display surface 1802 (step S228) and ends the measurement operation.

Note that in the ball mode, the unit of speed displayed on the display surface 1802 is set in advance to km/h by the control module 32.

Meanwhile, if step S216 is positive, steps S218, S220 are executed.

Descriptions will be omitted below for processes of steps S218 and S220 because they are similar to those of steps S18 and S22 in FIG. 14.

Next, the control module 32 displays the second speed data V2 as the ball speed on the display surface 1802 (step S224) and ends the measurement operation.

A decision of step S216 will be described in more detail.

When the microwave is used as the transmission wave W1, in contrast to the reflected wave W2 being generated at the soccer ball 54, normally, the majority of the transmission wave W1 is absorbed by the foot F of the user M due to physical properties thereof, and the intensity of the reflected wave W2 is therefore low.

Because of this, the Doppler signal Sd generated by the reflected wave W2 from the foot F is not recognized as an effective signal in the accumulation module 28, and, therefore, because the binarized signal is not detected, the decision of step S216 is negative, and steps S226 and S228 are executed.

However, if the Doppler signal generated by the reflected wave W2 from the foot F is recognized as the effective signal in the accumulation module 28 and the binarized signal is detected, the error included in the intermediate data accumulated in the accumulation module 28 becomes large.

If the fourth speed data V4 is found in this manner using the intermediate data that includes the error, accuracy of the fourth speed data V4 decreases.

Thus, if step S216 is positive, the second speed data V2 is measured using only the intermediate data of the second period ΔT2, and this second speed data V2 is displayed on the display surface 1802. By this, a speed of the ball 54 with an influence of foot F removed can be accurately measured and displayed.

Next, a situation where the moving body is the baseball and a speed of the ball pitched by a hand H of the user M is measured by the speed measuring device 10 will be described.

Figure 13:
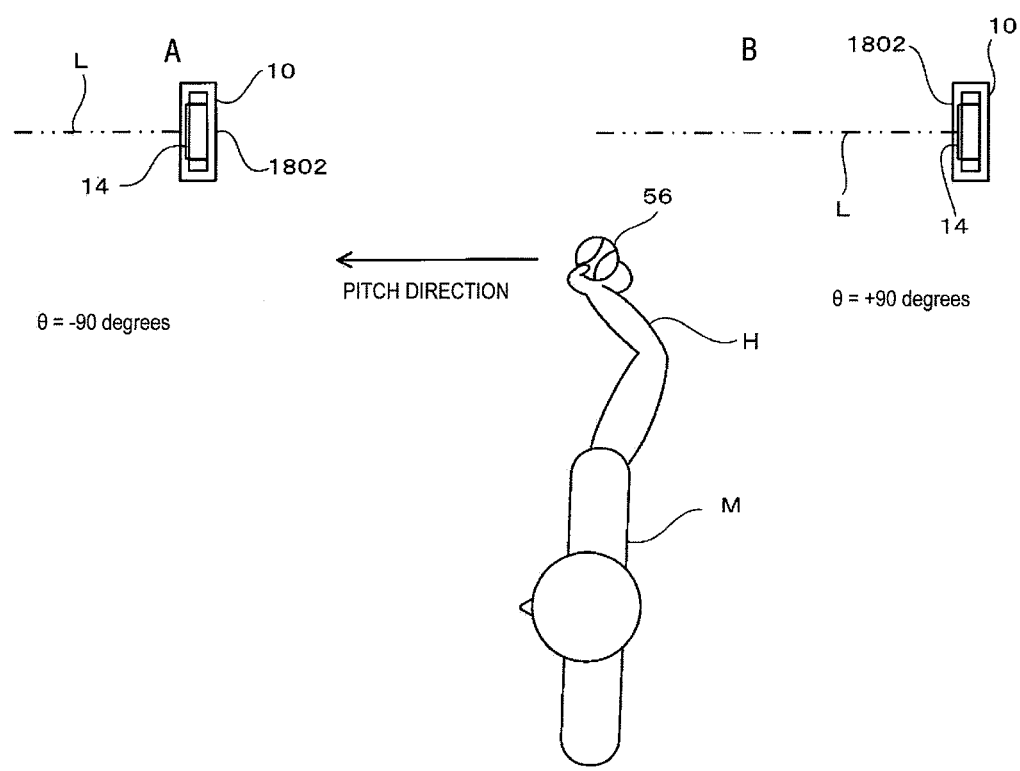
FIG. 13 is a top view that describes an installation state of the speed measuring device 10 when measuring a baseball 56 as the moving body.
Figure 17:
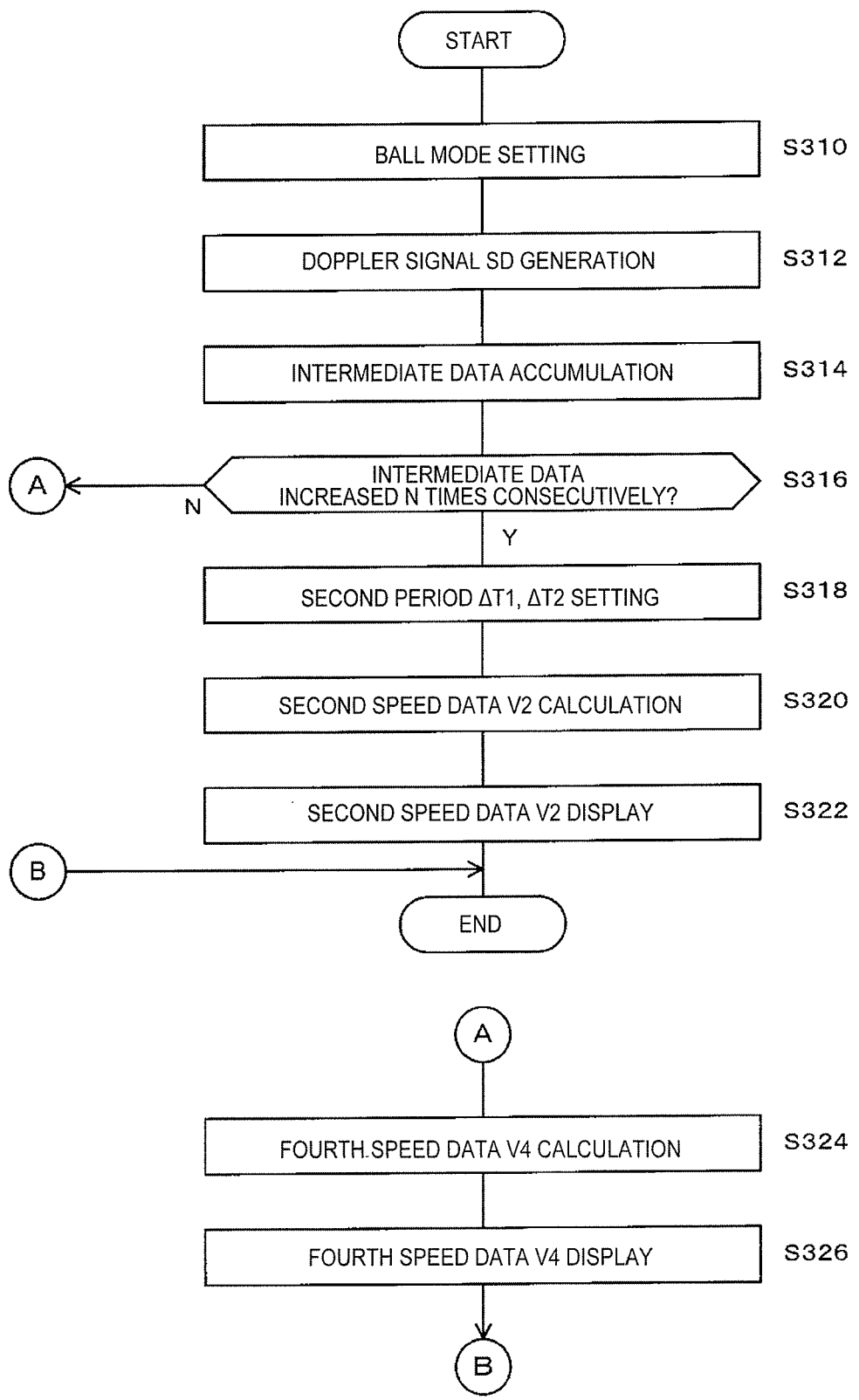
FIG. 17 is a flowchart showing an operation of the speed measuring device 10 when measuring the baseball 56 as the moving body.

FIG. 13 is a top view that describes an installation state of the speed measuring device 10 when measuring a baseball 56 as the moving body, and FIG. 17 is a flowchart showing an operation of the speed measuring device 10 when measuring the baseball 56 as the moving body.

As illustrated in FIG. 17, first, the user M operates the mode selection button to select as the measurement mode of the speed measuring device 10 the ball mode from among the golf mode, the bat mode, and the ball mode, and the control module 32 accepts the operation of the mode selection button to set the ball mode (step S310).

Next, the user M, as illustrated in FIG. 13 by the reference numeral A, installs the speed measuring device 10 in a pitch direction of the ball 56 (in the direction along the straight line connecting the home base and the pitcher) in a location, for example, about 1.5 m to 2.0 m in front of a standing position of the user M.

That is, the upper surface 1202 (display surface 1802) of the speed measuring device 10 is turned toward an opposite direction of the pitch direction, the front surface 1204 is turned upward, and the rear surface 1206 is turned toward the ground. Then, the antenna angle θ of the antenna 14 is adjusted, and the imaginary axis L is matched to the pitch direction.

In this situation, the antenna angle θ is, for example, −90 degrees.

The speed measuring device 10 may be mounted on the ground or installed via the fixture such as the tripod.

By this, the transmission wave W1 sent from the antenna 14 hits the ball 56, and the reflected wave W2 becomes receivable by the antenna 14.

Moreover, the user M becomes able to easily view the display surface 1802.

Alternatively, the user M, as illustrated by the reference numeral B in FIG. 13, installs the speed measuring device 10 in the pitch direction of the ball 56 in a location, for example, about 1.5 m to 2.0 m behind the standing position of the user M.

That is, the upper surface 1202 (display surface 1802) of the speed measuring device 10 is turned in a direction identical to the pitch direction, the front surface 1204 is turned upward, and the rear surface 1206 is turned toward the ground. Then, the antenna angle θ of the antenna 14 is adjusted, and the imaginary axis L is matched to the pitch direction.

In this situation, the antenna angle θ is, for example, +90 degrees.

As described above, the speed measuring device 10 may be mounted on the ground or installed via the fixture such as the tripod.

By this, the transmission wave W1 sent from the antenna 14 hits the ball 56, and the reflected wave W2 becomes receivable by the antenna 14.

Moreover, the user M becomes able to easily view the display surface 1802.

Therefore, the speed measuring device 10 can be installed in a position of either the reference numeral A or the reference numeral B.

Note that when the speed measuring device 10 is installed in the position of the reference numeral A, a movement direction of the ball 54 seen from the speed measuring device 10 is an approaching direction, and when the speed measuring device 10 is installed in the position of the reference numeral B, the movement direction of the ball 56 seen from the speed measuring device 10 is a distancing direction. However, because an absolute value of the movement speed calculated in either situation is identical, it is sufficient to display an absolute value of a numeric value of the calculated movement speed on the display surface.

Next, when the user M pitches the ball 56 with the hand H, the measurement operation by the speed measuring device 10 is executed.

Specifically, the transmission wave W1 is reflected by the hand H of the user M and the ball 56, the reflected wave W2 is received by the Doppler sensor 22, and the Doppler signal Sd is generated by the Doppler sensor 22 (step S312).

Description will be omitted below for processes of steps S314 and S316 because they are similar to those of steps S14 and S16 in FIG. 14.

If step S316 is negative, the speed calculation module 30C performs the fourth calculation operation that finds the fourth speed data V4 (step S326).

Next, the control module 32 displays the fourth speed data V4 as the ball speed on the display surface 1802 (step S328) and ends the measurement operation.

Meanwhile, if step S316 is positive, steps S318 and S320 are executed.

Description will be omitted below for processes of steps S318 and S320 because they are similar to those of steps S18 and S22 in FIG. 14.

Next, the control module 32 displays the second speed data V2 as the ball speed on the display surface 1802 (step S324) and ends the measurement process.

A decision of step S316 will be described in more detail.

When the microwave is used as the transmission wave W1, in contrast to the reflected wave W2 being generated at the baseball 56, normally, the majority of the transmission wave W1 is absorbed by the hand H of the user M due to physical properties thereof, similar to the situation of the foot F described above, and the intensity of the reflected wave W2 is therefore low.

Because of this, the Doppler signal Sd generated by the reflected wave W2 from the hand H is not recognized as the effective signal in the accumulation module 28, and, therefore, because the binarized signal is not detected, the decision of step S316 is negative, and steps S326 and S328 are executed.

However, if the Doppler signal generated by the reflected wave W2 from the hand H is recognized as the effective signal in the accumulation module 28 and the binarized signal is detected, the error included in the intermediate data accumulated in the accumulation module 28 becomes large.

If the fourth speed data V4 is found in this manner using the intermediate data that includes the error, accuracy of the fourth speed data V4 decreases.

Thus, if step S316 is positive, the second speed data V2 is measured using only the intermediate data of the second period ΔT2, and this second speed data V2 is displayed on the display surface 1802. By this, a speed of the ball 54 with an influence of the hand H removed can be accurately measured and displayed.

As described above, according to the speed measuring device 10 of this embodiment, the antenna supporting unit 16 that supports the antenna 14 so that the inclination of the imaginary axis L of the antenna 14 can be altered is provided on the housing 12 that holds the display 18.

Therefore, the display 18 can be put in a posture the user can view easily, and the movement direction of the moving body and the imaginary axis L of the antenna 14 can be matched. Because of this, both visibility of the display 18 and measurement accuracy of the movement speed of the moving body can be ensured under various measurement conditions.

Moreover, even if there is unevenness or a slope in the location where the speed measuring device 10 is installed, measurement accuracy of the movement speed of the moving body can be ensured by matching the imaginary axis L with the movement direction of the moving body by adjusting the inclination of the imaginary axis L of the antenna 14.

Furthermore, in this embodiment, support of the antenna 14 by the antenna supporting unit 16 is made so that the antenna angle θ, which is formed by the imaginary axis L and the imaginary plane P parallel to the flat display surface 1802 of the display 18, changes in the range of ±90 degrees.

Therefore, because an orientation of the display surface 1802 and an orientation of the imaginary axis L of the antenna 14 can be adjusted from an identical orientation to opposite orientations, this is more advantageous in ensuring both visibility of the display 18 and measurement accuracy of the movement speed of the moving body.

(Second Embodiment)

Next, a second embodiment will be described.

In the second embodiment, a situation where measurement accuracy of the movement speed of two moving bodies, the golf club head 4 (first moving body) and the golf ball 6 (second moving body) is improved.

Note that in the embodiment below, elements and members identical or similar to those of the first embodiment are assigned identical reference numerals, and descriptions thereof are omitted or described simply.

To ensure measurement accuracy of the movement speed of the moving body, it is crucial to match the imaginary axis L of the antenna 14 and the movement direction of the moving body.

Figure 19:
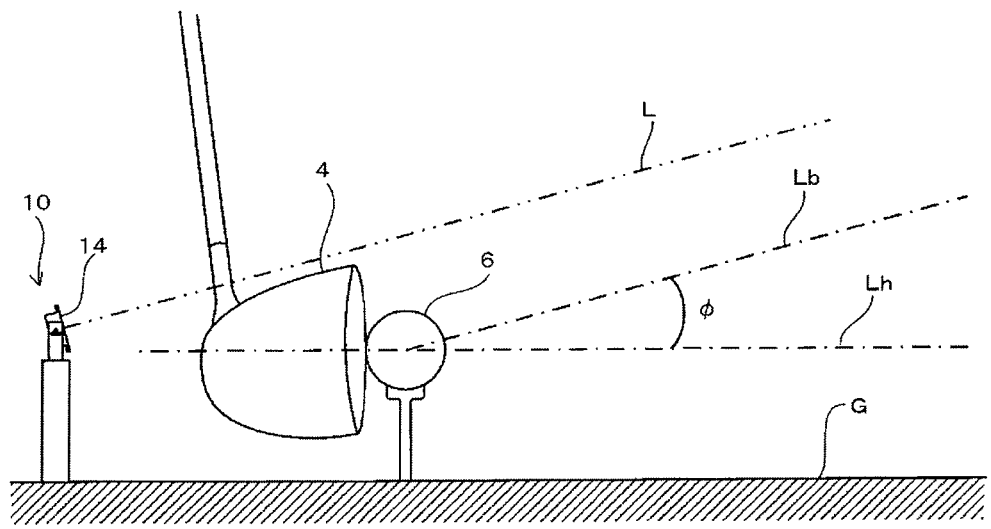
FIG. 19 is an explanatory view of an imaginary axis L and a deviation angle ϕ when the golf club head 4 is a wood-type club.

However, as illustrated in FIG. 19, when the swung golf club head 4 strikes the golf ball 6, while the movement direction of the golf club head 4 during striking is substantially a horizontal direction, the movement direction of the struck golf ball 6 changes according to a size of an angle formed by a face surface of the golf club head 4 and a horizontal surface G (ground).

In this embodiment, the angle formed by the face surface of the golf club head 4 and the horizontal surface G is defined as a loft angle of the golf club head 4.

Here, when the orientation of the imaginary axis L of the antenna 14 is matched to the movement direction of the golf ball 6 (made parallel to a movement trajectory Lb of the golf ball 6) to prioritize measurement accuracy of the movement speed of the golf ball 6, the imaginary axis L of the antenna 14 and the movement direction of the golf club head 4 no longer match.

Therefore, in this situation, while measurement accuracy of the movement speed of the golf ball 6 can be ensured, measurement accuracy of the movement speed of the golf club head 4 decreases.

Conversely from the above, when the imaginary axis L of the antenna 14 is matched to the movement direction of the golf club head 4 (made parallel to the movement trajectory Lh of the golf club head 4) to prioritize measurement accuracy of the movement speed of the golf club head 4, the orientation of the imaginary axis L of the antenna 14 and the movement direction of the golf ball 6 no longer match.

Therefore, in this situation, while measurement accuracy of the movement speed of the golf club head 4 can be ensured, measurement accuracy of the movement speed of the golf ball 6 decreases.

In this situation, if an angle that is formed by a movement trajectory Lh of the golf club head 4 and the imaginary axis L (that is, the movement trajectory Lb of the golf ball 6) is defined as a deviation angle φ when the movement trajectory Lh of the golf club head 4 is projected on an imaginary plane, which includes the imaginary axis L and extends in a vertical direction, in a state where the imaginary axis L is matched to the movement direction of the golf ball 6 (in a state where the movement trajectory Lb of the golf ball 6 and the imaginary axis L are parallel), an error included in the movement speed of the golf club head 4 and calculated by the measurement processing unit 24 increases as the deviation angle φ increases.

The deviation angle φ and the error described above are in a constant correlation.

Therefore, a correlation between the deviation angle φ and the error described above is actually measured, and, based on this correlation, a relational expression is found that resolves the error, which is included in the movement speed of the golf club head 4 and calculated by the measurement processing unit 24, according to the deviation angle φ.

Then, by performing a corrective calculation that corrects the error included in the movement speed of the golf club head 4 from the deviation angle φ using this relational expression, it becomes possible to calculate an accurate movement speed of the golf club head 4.

Figure 18:
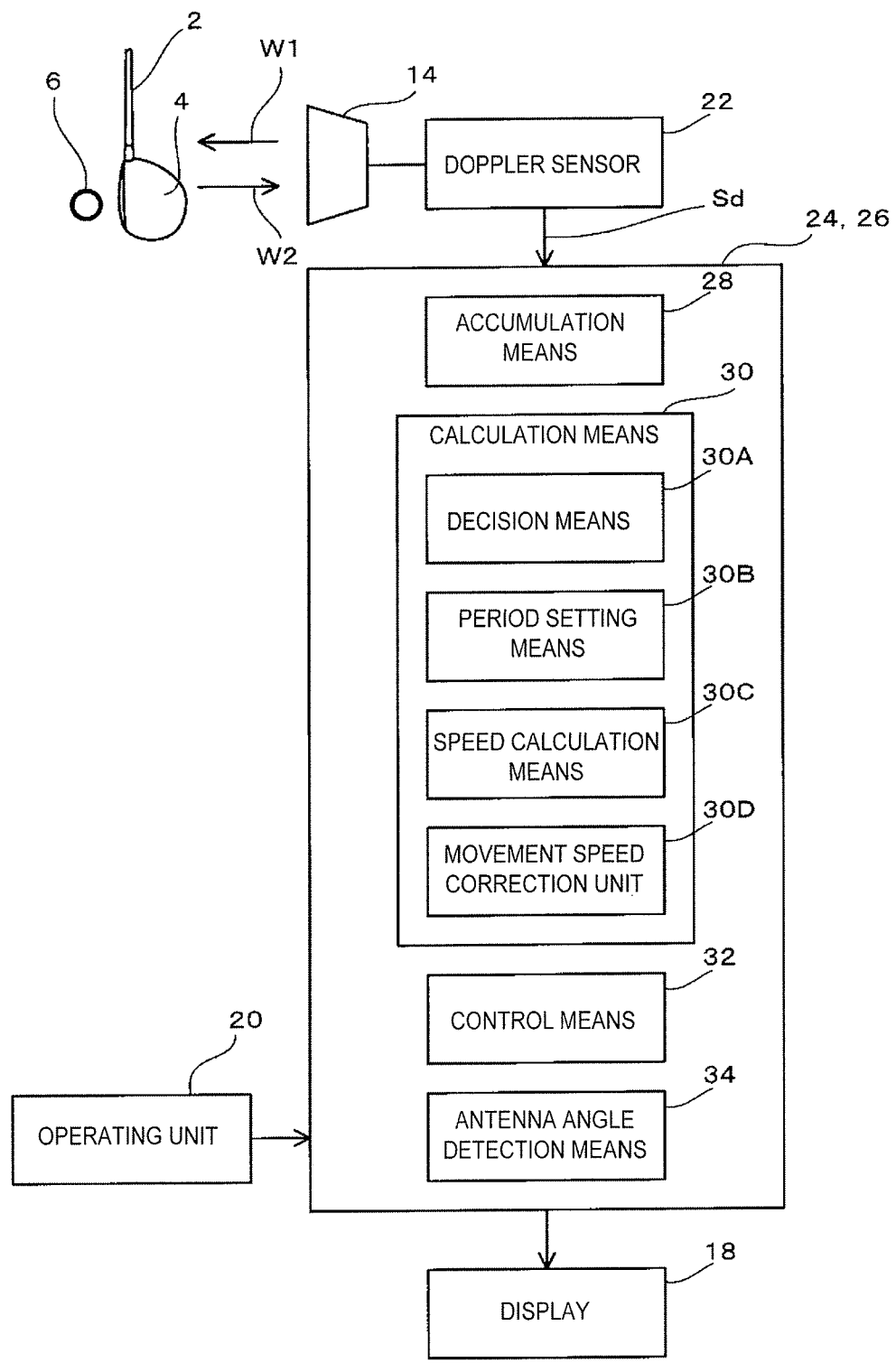
FIG. 18 is a functional block diagram of the speed measuring device 10 according to a second embodiment.

Thus, in the second embodiment, a movement speed correction unit 30D is provided, as illustrated in FIG. 18.

That is, the movement speed correction unit 30D performs the corrective calculation of the movement speed of the golf club head 4 based on a designated deviation angle φ to resolve the error included in the movement speed (first movement speed) of the golf club head 4 calculated by the speed calculation module 30C.

Therefore, the control module 32 displays on the display 18 the movement speed of the golf ball 6 calculated by the speed calculation module 30C and the movement speed of the golf club head 4 corrected by the movement speed correction unit 30D.

In this situation, designation of the deviation angle φ for the movement speed correction unit 30D can be performed as below.

That is, the loft angle of the golf club head 4 is used as the deviation angle φ. When the user inputs the loft angle by operating the operating unit 20, the control module 32 accepts the input deviation angle φ and sets this to the movement speed correction unit 30D.

However, in the above procedure, there is a disadvantage where the user must input the deviation angle φ by hand each time, making operation cumbersome.

Here, a relationship between the loft angle of the golf club head 4, the antenna angle θ, and the deviation angle φ will be considered.

Figure 20:
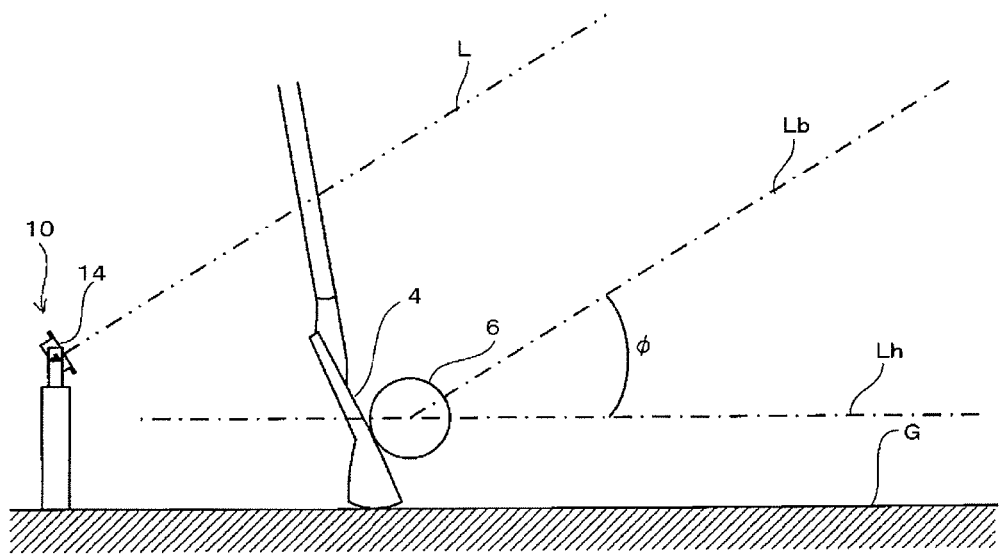
FIG. 20 is an explanatory view of the imaginary axis L and the deviation angle ϕ when the golf club head 4 is an iron-type club.

FIG. 19 illustrates a situation where the golf club head 4 is a wood-type club and the loft angle is small, and FIG. 20 illustrates a situation where the golf club head 4 is an iron-type club and the loft angle is large.

As illustrated in FIGS. 19 and 20, when an angle that is formed by the movement trajectory Lb of the golf ball 6, which is struck by the face surface of the golf club head 4, and the horizontal surface G coincides with the loft angle and the imaginary axis L of the antenna 14 is matched to the movement direction of the golf ball 6, the antenna angle θ is determined in correspondence with the loft angle.

Then, as described above, the deviation angle φ is determined in correspondence with the loft angle.

Therefore, the antenna angle θ and the deviation angle φ are made to correspond in advance, and the deviation angle φ can be specified if the antenna angle θ is determined.

Thus, in the second embodiment, an antenna angle detection unit 34 that detects the antenna angle θ is provided, and the corrective calculation by the movement speed correction unit 30D described above is performed by specifying the deviation angle φ made to correspond to the antenna angle θ detected by the antenna angle detection unit 34.

The antenna angle detection unit 34 is provided, for example, in the case 16B of the antenna supporting unit 16 and can be configured by an angle sensor that detects a rotation amount of the case 16B around the support shaft 16C; various conventionally known sensors can be used as such an angle sensor.

According to such a second embodiment, the corrective calculation of the movement speed of the golf club head 4 is performed based on the deviation angle φ that is formed by the movement trajectory Lh and the imaginary axis L when the movement trajectory Lh of the golf club head 4 (first moving body) is projected on the imaginary plane, which includes the imaginary axis L and extends along the vertical direction, in the state where the imaginary axis L is matched to the movement direction of the golf ball 6 (second moving body).

Therefore, this is advantageous in ensuring measurement accuracy of the movement speeds of both the golf club head 4 and the golf ball 6.

Moreover, because the corrective calculation by the movement speed correction unit 30D is performed by specifying the deviation angle φ made to correspond with the antenna angle θ detected by the antenna angle detection unit 34, the cumbersome operation of inputting the deviation angle φ using the operating unit 20 is unnecessary, which is advantageous in improving operability.

(Third Embodiment)

Next, a third embodiment will be described.

As described in the first embodiment (FIGS. 9 to 13), the user M is able to easily see the display 18 by changing the posture of the housing 12 of the speed measuring device 10 and the orientation of the antenna 14 according to a measurement condition, that is, a type of ball (type of ball sport) to be measured.

However, depending on a positional relationship between the user M and the display surface 1802 of the display 18, there is no guarantee that a direction of the display contents (an orientation of characters or symbols) displayed on the display surface 1802 can be easily seen and read by the user M.

Thus, in a third embodiment, the control module 32 (display control module) controls a rotational position of the display contents displayed on the display surface 1802, which is defined by a rotational angle whose center is a normal line running through a center of the display surface 1802. Specifically, the rotational position of the display contents is made to switch 90 degrees at a time.

The rotational position of the display contents is set by commanding the control module 32 by an operation input by the operating unit 20.

Description below will refer to FIGS. 9 to 13 and FIGS. 21 to 23.

Figure 21:
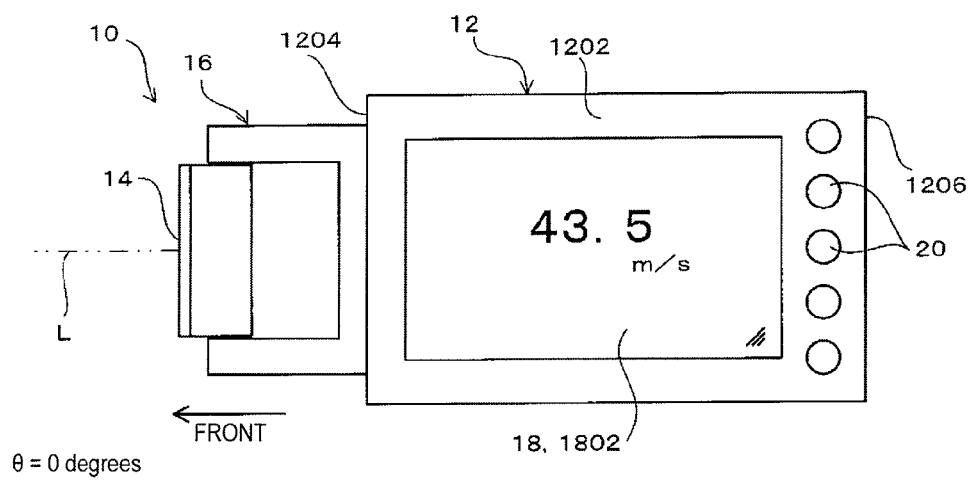
FIG. 21 is a first explanatory view illustrating a display direction of display contents of a display surface 1802 in the speed measuring device 10 according to a third embodiment.

As illustrated in FIG. 9, when measuring the movement speeds of the golf club head 4 and the golf ball 6, or, as illustrated in FIG. 12, when measuring the movement speed of the kicked ball 54, the control module 32 performs a display such as that illustrated in FIG. 21.

That is, the upper surface 1202 of the housing 12 is turned upward, and the front surface 1204 is turned toward the movement direction (forward) of the golf ball 6 (ball 54). Moreover, the antenna angle θ of the antenna 14 is 0 degrees. At this time, the control module 32 determines the rotational position of the display contents so that the display contents can be viewed while standing when viewing the display surface 1802 from one side of the width direction of the housing 12.

Figure 22:
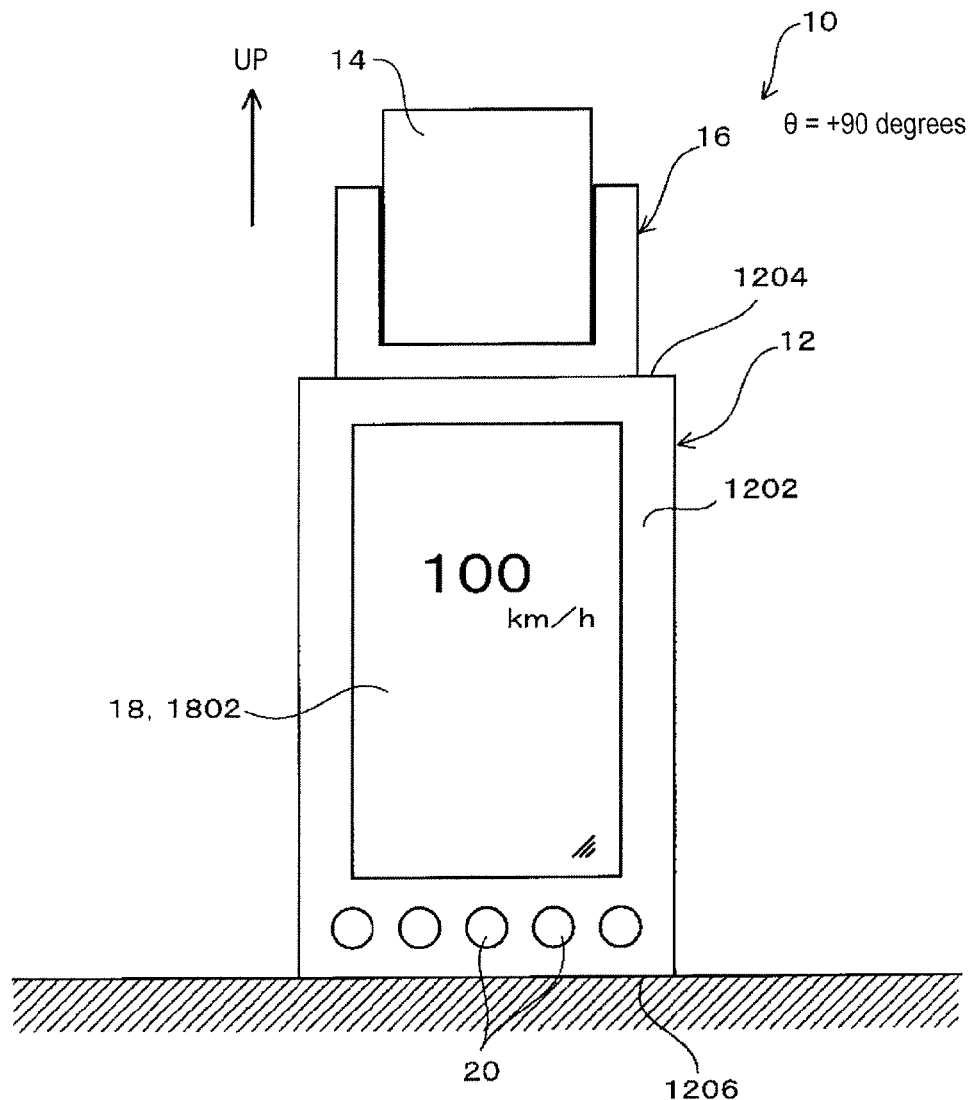
FIG. 22 is a second explanatory view illustrating the display direction of the display contents of the display surface 1802 in the speed measuring device 10 according to the third embodiment.

As illustrated in FIG. 10 or 11, when measuring the movement speed of the bat 50, the control module 32 performs a display such as that illustrated in FIG. 22.

That is, the front surface 1204 of the housing 12 is turned upward, and the upper surface 1202 is turned toward the movement direction (forward) of the bat 50.

Moreover, the antenna angle θ of the antenna 14 is +90 degrees. At this time, the control module 32 determines the rotational position of the display contents so that the display contents can be viewed while standing when viewing the display surface 1802 from the front of the housing 12.

Figure 23:
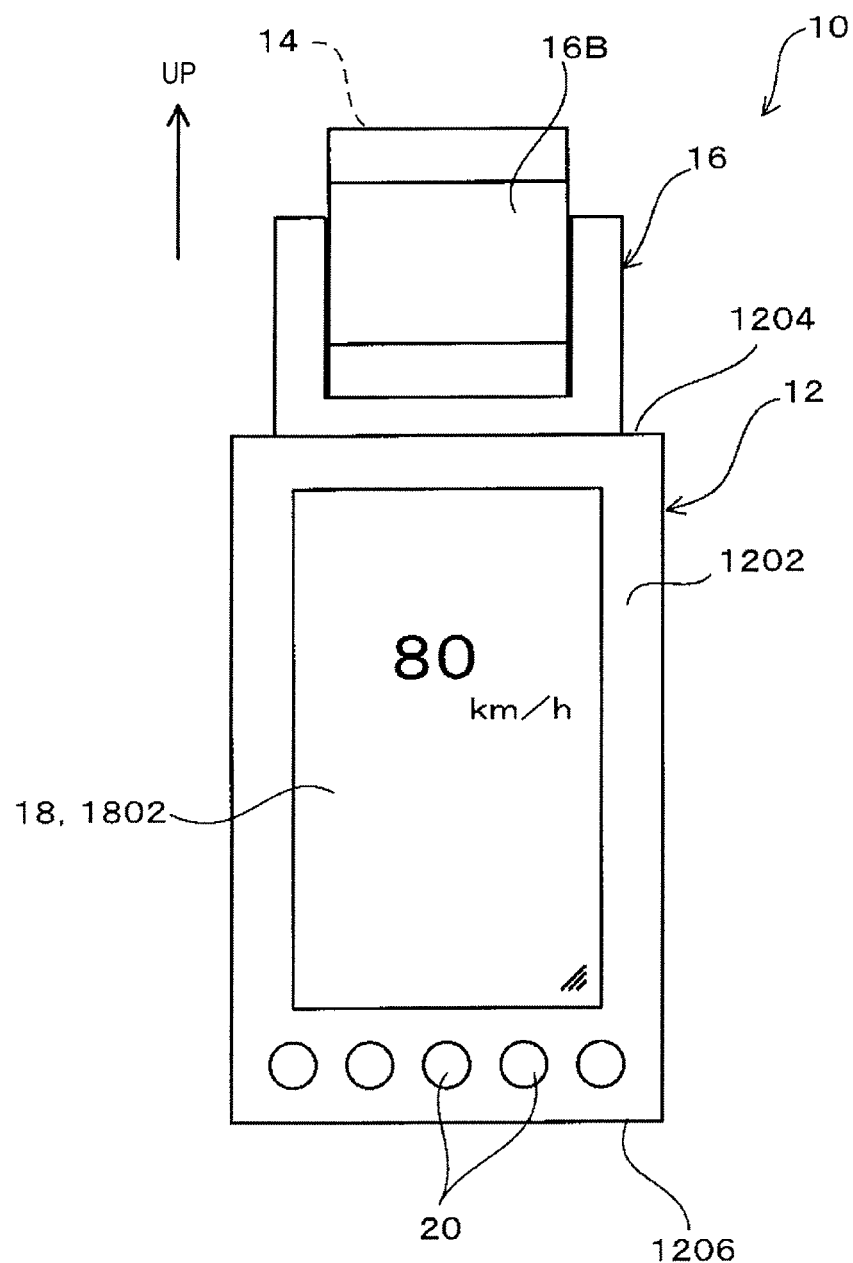
FIG. 23 is a third explanatory view illustrating the display direction of the display contents of the display surface 1802 in the speed measuring device 10 according to the third embodiment.

As illustrated in FIG. 13, when measuring the movement speed of the pitched ball 56, the control module 32 performs a display such as that illustrated in FIG. 23.

That is, the front surface 1204 of the housing 12 is turned upward, and the upper surface 1202 is turned toward the movement direction (forward) of the ball 56. Moreover, the antenna angle θ of the antenna 14 is −90 degrees. At this time, the control module 32 determines the rotational position of the display contents so that the display contents can be viewed while standing when viewing the display surface 1802 from the front of the housing 12.

According to the third embodiment, because the rotational position of the display contents displayed on the display surface 1802, which is defined by the rotational angle whose center is the normal line running through the center of the display surface 1802, is controlled, the direction of the display contents displayed on the display surface 1802 can be made an easy-to-read direction regardless of the positional relationship between the user M and the display surface 1802 of the display 18, and this is more advantageous in increasing visibility.

Moreover, in the above description, the rotational position of the display contents displayed on the display surface 1802 is set by the operation of the operating unit 20, but the rotational position of the display contents displayed on the display surface 1802 may be controlled in conjunction with, for example, the measurement mode (golf mode, bat mode, ball mode).

Note that in this embodiment, the bat mode is described using the baseball bat and ball as examples, but the moving body to be measured is arbitrary and may be, for example, a tennis or badminton racket or the like.

Moreover, the ball mode is described using the soccer ball and the baseball as examples, but the moving body to be measured is arbitrary and may be a volleyball or a handball, or a shot, a javelin, a hammer, or the like used in a throwing competition.

The invention claimed is:

1. A speed measuring device for a moving body, comprising:

an antenna having directionality that transmits a transmission wave toward the moving body based on a supplied transmission signal and generates a reception signal by receiving a reflected wave reflected by the moving body, the moving body including a first moving body and a second moving body launched by being struck by the first moving body;

a Doppler sensor that supplies the transmission signal to the antenna and generates a Doppler signal having a Doppler frequency based on the reception signal;

a measurement processing unit that calculates a movement speed of the moving body based on the Doppler signal, the measurement processing unit comprising:

an accumulation module that samples the Doppler signal with a predetermined sampling period and accumulates the signal by converting the signal into an intermediate data made to correspond to the Doppler frequency; and a calculation module that detects a boundary point where a rapid change in the movement speed of the moving body is generated based on the accumulated intermediate data and finds a first speed data as a maximum speed of the movement speed in a first period before the boundary point and a second speed data as an average speed of the movement speed in a second period after the boundary point;

a display that displays display content including the calculated movement speed, displays the first speed data as a first movement speed of when the first moving object strikes the second moving object, and displays the second speed data as a second movement speed of when the second moving body is launched;

a housing that holds at least the display; and an antenna supporting unit provided on the housing that supports the antenna so that an inclination of an imaginary axis can be altered when an imaginary line extending along a direction where a gain of the antenna is maximized is defined as the imaginary axis that indicates an orientation direction of the antenna.

2. The speed measuring device for a moving body according to claim 1, wherein the display has a flat display surface, and support of the antenna by the antenna supporting unit is configured so that, when an angle the imaginary axis forms with an imaginary plane parallel to the display surface is defined as an antenna angle θ, the antenna angle θ changes within a predetermined range.

3. The speed measuring device for a moving body according to claim 2, wherein the predetermined range is ±90 degrees.

4. The speed measuring device for a moving body according to claim 2, wherein the antenna supporting unit is provided with a click mechanism that holds the antenna at a predetermined plurality of antenna angles θ.

5. The speed measuring device for a moving body according to claim 2, wherein an angle display is provided on the antenna supporting unit to indicate on which of the predetermined plurality of antenna angles θ the antenna is positioned.

6. The speed measuring device for a moving body according to claim 1, wherein the calculation module comprises:

a decision module that decides whether the movement speed of the moving body rapidly decreased by deciding whether the intermediate data accumulated in the accumulation module increased or decreased a numeric value N times (N is a natural number greater than or equal to 2) consecutively over time;

a period setting module that, when a decision result by the decision module is positive, defines as the boundary point a time point when the intermediate data increased or decreased the numeric value N times consecutively, and that sets a period from a sampling time point of a leading data of the intermediate data to the boundary point as the first period and a period from the boundary point to a sampling time point of a final data of the intermediate data as the second period; and a speed calculation module that performs a first calculation operation that finds the first speed data based on a minimum value or a maximum value of the intermediate data in the first period, and performs a second calculation operation that finds the second speed data based on an average value of the intermediate data in the second period.

7. The speed measuring device for a moving body according to claim 1, wherein
the calculation module comprises:
a decision module that decides whether the movement speed of the moving body rapidly decreased by deciding whether an absolute value of a change amount per unit time of the intermediate data accumulated in the accumulation module exceeded a predetermined threshold;
a period setting module that, when a decision result by the decision module is positive, defines as the boundary point a time point when the change amount per unit time of the intermediate data exceeded the threshold, and that sets a period from a sampling time point of a leading data of the intermediate data to the boundary point as the first period and a period from the boundary point to a sampling time point of a final data of the intermediate data as the second period; and
a speed calculation module that performs a first calculation operation that finds the first speed data based on a minimum value or a maximum value of the intermediate data in the first period, and performs a second calculation operation that finds the second speed data based on an average value of the intermediate data in the second period.

8. The speed measuring device for a moving body according to claim 6, wherein
the second calculation operation by the speed calculation module is performed on the intermediate data corresponding to data between a predetermined upper limit value and lower limit value in the second period,
the upper limit value is a value that multiplies the intermediate data corresponding to the first speed data by a predetermined first coefficient, and
the lower limit value is a value that multiplies the intermediate data corresponding to the first speed data by a predetermined second coefficient, which is a value less than the first coefficient.

9. The speed measuring device for a moving body according to claim 6, wherein
the speed calculation module, when the decision result by the decision module is negative, performs a third calculation operation that finds a third speed data as a maximum speed based on a minimum value or a maximum value of all of the intermediate data accumulated in the accumulation module.

10. The speed measuring device for a moving body according to claim 6, wherein
the speed calculation module, when the decision result by the decision module is negative, performs a fourth calculation operation that finds a fourth speed data as an average speed based on an average value of all of the intermediate data accumulated in the accumulation module.

11. The speed measuring device for a moving body according to claim 1, wherein,
if an angle that a movement trajectory forms with the imaginary axis when the movement trajectory of the first moving body is projected on an imaginary plane, which includes the imaginary axis and extends in a vertical direction, in a state where the imaginary axis is matched to the movement direction of the second moving body is defined as a deviation angle $\phi$,
a movement speed correction unit is provided for performing a corrective calculation of the first movement speed based on the designated deviation angle $\phi$ to resolve an error included in the first movement speed calculated by the measurement processing unit.

12. The speed measuring device for a moving body according to claim 11, wherein
an antenna angle detection unit that detects the antenna angle $\theta$ is provided, and
the corrective calculation by the movement speed correction unit is performed by specifying the deviation angle $\phi$ made to correspond with the detected antenna angle $\theta$.

13. The speed measuring device for a moving body according to claim 1, wherein
a display control module is provided for controlling a rotational position of the display contents displayed on the display surface, which is defined by a rotational angle whose center is a normal line running through a center of the display surface.

14. The speed measuring device for a moving body according to claim 1, wherein
an orientation angle of the antenna is 5 to 90 degrees.

15. The speed measuring device for a moving body according to claim 1, wherein
a frequency band of the transmission wave is 24 GHz or 10 GHz.

16. The speed measuring device for a moving body according to claim 1, wherein
a unitary module that unitarily provides the antenna and the Doppler sensor is configured.

17. The speed measuring device for a moving body according to claim 3, wherein
the antenna supporting unit is provided with a click mechanism that holds the antenna at a predetermined plurality of antenna angles $\theta$.

18. The speed measuring device for a moving body according to claim 4, wherein
an angle display is provided on the antenna supporting unit to indicate on which of the predetermined plurality of antenna angles $\theta$ the antenna is positioned.

* * * * *